US012612960B2

(12) United States Patent　　　(10) Patent No.:　US 12,612,960 B2

Xi et al.　　　(45) Date of Patent:　Apr. 28, 2026

(54) MUSCLE-LIKE ACTUATORS FOR WEARABLE SYSTEMS

(71) Applicant: The University of Hong Kong, Hong Kong (CN)

(72) Inventors: Ning Xi, Hong Kong (CN); Qingqing Zhang, Hong Kong (CN); Yafei Zhao, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 251 days.

(21) Appl. No.: 18/341,597

(22) Filed: Jun. 26, 2023

(65) Prior Publication Data

US 2023/0417307 A1　　Dec. 28, 2023

Related U.S. Application Data

(60) Provisional application No. 63/355,986, filed on Jun. 27, 2022.

(51) Int. Cl.
| | |
|---|---|
| *F16H 19/06* | (2006.01) |
| *D07B 1/14* | (2006.01) |
| *D07B 5/00* | (2006.01) |
| *F16H 35/18* | (2006.01) |

(52) U.S. Cl.
CPC ......... *F16H 19/0654* (2013.01); *D07B 1/141* (2013.01); *D07B 5/00* (2013.01); *F16H 35/18* (2013.01); *D07B 2205/20* (2013.01); *D07B 2501/2084* (2013.01); *D10B 2401/061* (2013.01)

(58) Field of Classification Search
CPC .................................................. F16H 19/0654
See application file for complete search history.

(56) References Cited

U.S. PATENT DOCUMENTS

| | | | |
|---|---|---|---|
| 9,574,646 B1 | 2/2017 | Edsinger et al. | |
| 9,950,422 B2 | 4/2018 | Kornbluh et al. | |
| 2012/0267205 A1* | 10/2012 | Barker ..................... | D07B 5/00 |
| | | | 188/269 |
| 2015/0343647 A1 | 12/2015 | Garcia et al. | |

OTHER PUBLICATIONS

Bombara et al., A Twisted String Actuator-Driven Soft Robotic Manipulator, IFAC PapersOnLine, 54-20, (2021) pp. 141-146) (Year: 2021).*

David Bombara, et al., "A Twisted String Actuator-Driven Soft Robotic Manipulator," IFAC Papers On Line 54-20 (2021) pp. 141-146.

* cited by examiner

*Primary Examiner* — Andrew J Bowman

(74) *Attorney, Agent, or Firm* — Leason Ellis LLP

(57) ABSTRACT

A muscle-like actuator comprises a motor with a rotatable drive shaft and a string with a shear thickening fluid (STF) embedded therein. One end of the string is attached to the drive shaft and the other end is connected to a load to form a twisted string actuator (TSA). By controlling the speed and current of the motor, the characteristics of the actuator can be changed. Multiple strings may be located in a flexible soft tube to improve the mechanical properties of the actuator.

11 Claims, 23 Drawing Sheets

(a)           (b)

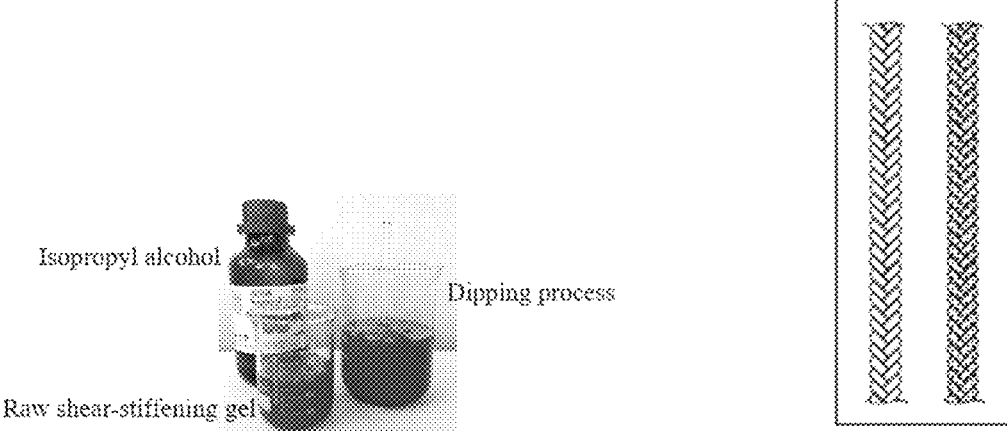
FIG. 7A
FIG. 7B
20
Single twisted STF/ Kevlar string
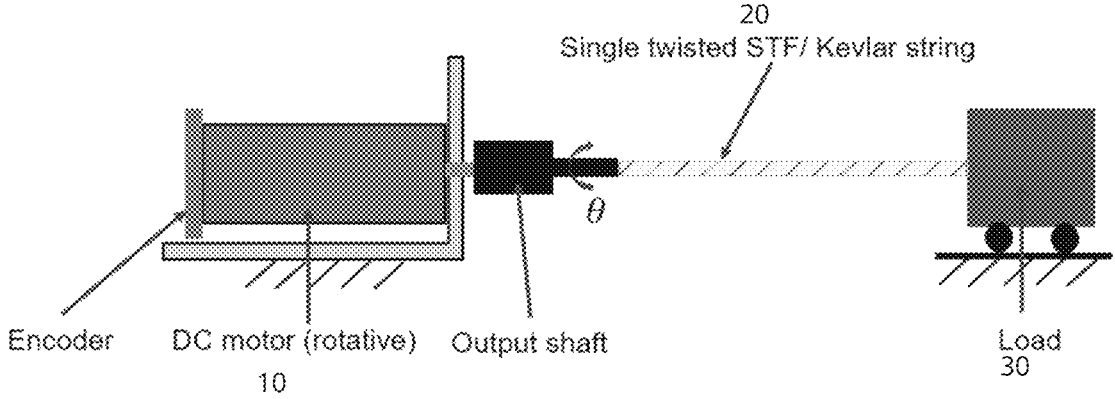
Encoder    DC motor (rotative)    Output shaft           Load
           10                                      30
FIG. 8
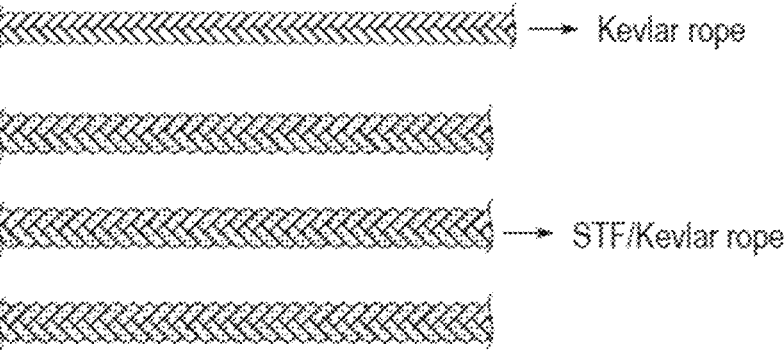
FIG. 9A

FIG. 11A
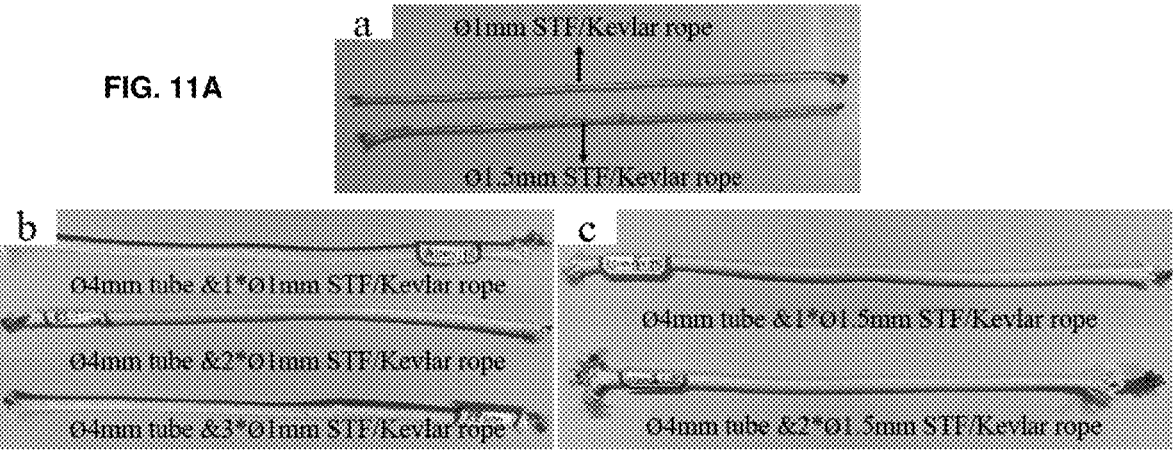
FIG. 11B
FIG. 11C
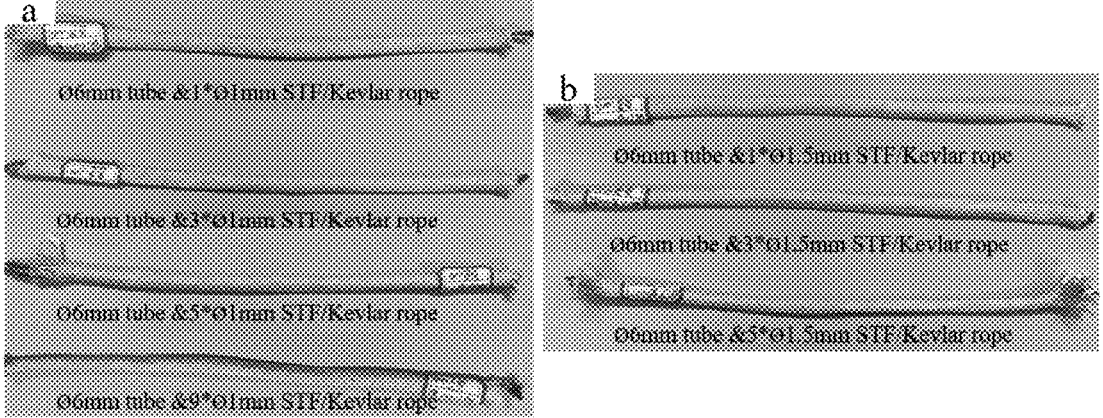
FIG. 12A
FIG. 12B

MUSCLE-LIKE ACTUATORS FOR WEARABLE SYSTEMS

CROSS REFERENCE TO RELATED APPLICATION

This application claims the benefit of priority under 35 U.S.C. Section 119(e) of U.S. Application No. 63/355,986 filed 27 Jun. 2022, which is incorporated herein by reference in its entirety.

FIELD OF THE INVENTION

The present invention relates to wearable robots for assisting human muscles in daily activities and, more particularly, to soft wearable robots with actuators that work similar to human muscles.

BACKGROUND OF THE INVENTION

Most of the existing wearable robots are large, heavy and inflexible, such as the exoskeletons, automatic wheelchairs and so on. Based on mechanical properties, the wearable robots are classified into two categories: rigid exoskeletons and soft exoskeletons. Rigid exoskeletons have become an effective way of allowing paraplegic and hemiplegic persons to regain mobility. Several representative devices including Rewalk™ (Re Walk Robotics Ltd), Ekso™ (University of California, Berkeley and Berkeley Bionics Inc.), HALr (University of Tsukuba and Cyberdyne Company), Indego™ (Vanderbilt University and Parker Hannifin Corp), Mina v2, WalkON Suit, all of which have excellent properties. These types of wearable robots always have a rigid structure with multiple degrees of freedom, providing solid support so people can maintain their balance and be assisted with walking.

Conventionally, rigid exoskeletons are designed based on the concentricity of human joints and motor joints, while rigid linkage-joint systems are implemented as the bridge to transmit applied torque and to maintain joint concentricity between the exoskeleton and the human. This makes these rigid exoskeletons bulky and lumpy. Otherwise, these structures cannot sustain the aligned relationship between the solid structure and human limbs. To attach this equipment onto the human body, multiple linkages from the exoskeleton are required to be attached to different parts of human limbs without slack, so the firmly tightened fixing stripes can often make users feel uncomfortable.

Although clinical trials have been conducted for many rigid exoskeletons, these existing devices are still too technically complex and expensive for practical use. Additionally, the weight of these exoskeletons is substantial, and in extreme cases (e.g., Mina v2 weighing 34 kg), they have a large profile that often creates great physical and psychological burdens on users, which limits their applications.

Since the inflexible structure of rigid exoskeletons can restrict the freedom of movement and affect the comfort of wearers to some extent, many researchers have focused on developing soft exoskeletons. For example, a research team at Harvard University has developed multiple generations of exosuits, applying Bowden cables driven by geared electric motors to generate an assisting force, which is parallel to the hip and leg muscles, with the acting point being connected to the ankle joint to provide physical support. Another group from the XoSoft EU project, following user-centered principles, has developed a series of soft exoskeletons by adopting electromagnetic clutch-controlled elastic bands to support flexion of the knee and hip based on the motion and intention of the wearer.

Other studies have focused on inflatable wrinkle actuators, pneumatic muscles, elastofluid drivers, and supercoiled polymer to exert assistive forces at different human joints. Compared to rigid exoskeletons, soft exoskeletons have many advantages, such as being lightweight, comfortable, highly flexible, and as having a high biologically relevant force-generating capability. However, the drive speed and response time of current soft actuation systems are limited, and sometimes the power does not sufficiently support human joint movement.

Nowadays, soft actuators have been developed for a variety of applications. A considerable number of them have been developed and applied to wearable robots. However, the actuation mechanisms of most of them rely on pressurized chambers, like fluidic soft actuators and McKibben air muscles. The fluidic soft actuators usually deform as embedded elastomer channels are expanded by pressurized fluid. However, this is in contrast to the mechanism of muscle contraction by providing support force rather than tensile force.

In order to improve on these soft actuators, muscle-like actuators have been proposed that draw inspiration from human muscles and tendons and can produce biologically inspired motions. Muscle-like actuators are materials and devices that conform to biologically inspired motions to generate work when excited by a stimulus, such as an electric/magnetic field, thermal energy, electrochemical energy, fluid pressure, etc. These muscle-like actuators can generate forces by contracting and extending to achieve joint motions. Such muscle-like actuators are equipped with soft materials that can behave with variable stiffness so as to provide physical support when necessary but become soft when not need. These muscle-like actuators, ranging from twisted string actuators to pneumatic artificial muscles, are increasingly popular for biomimetic robots as they may actuate without complex linkage designs.

Kornbluh proposed twisted string actuators for an exosuit system (Kornbluh, Roy David, et al. "Twisted string actuators for an exosuit system." U.S. Pat. No. 9,950,422. 24 Apr. 2018.) to apply force to the body of the wearer. The stretchable force is applied on the exosuit but the device cannot achieve adjustable force-length-velocity output. Similar to Edsinger's Twisted string transmission (Edsinger, Aaron, et al. "Twisted string transmission." U.S. Pat. No. 9,574,646. 21 Feb. 2017.), they are not muscle-like twisted actuators and they have no muscle properties, either active properties (e.g., force curve under multiple motor approach) or passive properties (e.g., passive stretchable properties) achieved by their actuator. US Patent Application Publication 2015/0343647 A1 (3 Dec. 2015) discloses twisted string actuators designed to actuate a robotic finger. The strings are a pair of cords where one end of the cords is attached to the rotor and an opposite end of the twisted cords is coupled to a load. Rotary motion of the rotor in one direction operates to twist the pair of cords to generate a pulling force. In a paper entitled "A Twisted String Actuator-Driven Soft Robotic Manipulator," IFAC Papers On Line; University of Nevada, pub on 15 Dec. 2021, the twisted string actuators are designed to power a soft robotic manipulator. The strings are ultra-high molecular-weight polyethylene (UHMWPE). Actuation is realized by twisting the strings with a motor to shorten the strings' length and linearly displace the attached load. Brushed DC motors are adopted to twist the pairs of strings. The soft arm is constructed from Smooth-On Eco-flex™ 00-50 silicone and provides support and guidance for the TSAs.

Shape memory alloy (SMA) and shape memory polymer (SMP) actuators are made from shape memory materials that can change to temporary shapes and then recover their memorized shapes under external stimuli (temperature). The SMA actuators exhibit high power density (50 W/g) and high stress (200 MPa). Their main limitations are small contraction, low bandwidth, low efficiency, and significant hysteresis and creep. The SMP can produce high recoverable strains (100-400%); however, the stress and response speed are very low.

Electroactive polymer (EAP) actuators are a type of active polymers that can change their shape under electrical stimuli. DEA (dielectric elastomer actuators) and IPMC (ionic polymer-metal composites) actuators are the most popular types that show large strain and high bandwidth. DEA is a soft elastomeric polymer film coated on compliant electrodes on two opposite surfaces. When a differential voltage is applied between the electrodes, the film's thickness reduces due to the Coulomb charge attraction effect, which causes expansion in the other dimensions. DEA has good power density and high efficiency, but it requires large voltages and it is difficult to produce electrodes for them. The IMPC actuator can produce bending motions under an electrical field due to a fluid-induced swelling force and an electrostatic force. It exhibits low working voltage and high working frequency. The main disadvantages are its low power density (0.02 W/g) and low stress (0.3 MPa).

Pneumatic air muscle (PAM) actuators are one type of soft fluidic actuator that converts energy from compressed air to mechanical motion. The PAM is constructed of an internal bladder surrounded by a braided mesh shell and it can realize extending, bending, and twisting motions. It has a large payload-to-weight ratio, lightweight and inherent compliant behavior. The main challenges include low energy efficiency due to the compressors or air sources as well as inaccurate modelling and control because of system nonlinearities.

SCP (supercoiled polymer) actuators are constructed from twisting polymer fibers or filaments, such as nylon fishing lines and carbon nanotube yarns. A motor is employed for twist insertion to manufacture SCP actuators and heat treatment can increase the strain variation range. SCP actuators have large actuation range and significant mechanical power, the contraction rate can reach up to 49%, and the power density can be as high as 27 W/g. However, the largest force of a single SCP actuator is just around 1 N. Thus, multiple actuators are required to obtain a larger force. The friction-induced hysteresis can cause 15% error with a linear model.

In a paper entitled "Impact Resistance of Shear Thickening Fluid (STF)/Kevlar Composites for Body Armor Application," Advanced Materials Research; Beijing University of Chemical Technology; pub date: 31 Oct. 2013 there is disclosed polyborodimethylsiloxane (PBDMS) synthesized in combination with Kevlar fabric for use as a body protection material not as a twisted string actuator.

Most of existing wearable robots introduced by pressurized actuators mainly focus on assisting human movement from the functional level. When it comes to the physiological level, there is a need for muscle-like actuators to mimic physical muscle properties, i.e., mapping the force-length-velocity curve of physical muscles.

SUMMARY OF THE INVENTION

The present invention is directed to soft wearable robots for assisting human muscles in daily activities in which artificial muscles are achieved with twisted string actuators (TSA) impregnated with shear thickening materials.

A twisted string actuator is a string, e.g., made of Kevlar, which is connected to the drive shaft of a motor at one end and to a load at the other end. When the motor turns it twists the string, which results in a linear displacement and pulling force at the load end. The motor can be a small-size dc motor.

The twisted string actuator can act as a variable-stiffness artificial muscle by impregnating the string with a shear thickening fluid (STF) resulting in an STF-based twisted string actuator (TSA). Shear thickening materials have unique strain-rate sensitivity, so increasing the twisting speed can increase the shear rate of fibers of string acting on STF and thus the elastic modulus of STF. The TSA features a high twisting speed, and when the twisting speed reaches the critical shear rate of liquid-solid transition of STF, the overall stiffness of the string suddenly increases, thus improving the elastic modulus, stiffness and output of pulling force of STF-based TSA, which gives such actuator the characteristic of variable stiffness similar to human muscles. This variable stiffness actuator design aims to augment the musculature's function by providing an auxiliary pulling force, similar to ligaments and tendons connected to human joints such as knees, ankles, arms, etc.

More than one string can be posed in a fiber soft tube, e.g., a Kevlar fiber tube. Further, the muscle-like actuator can include a series elastic elements located between the load and the end of the twisted string actuator, and a parallel elastic element located in parallel with the twisted string actuator. The elastic element can be silicone rubber or a fabric.

BRIEF DESCRIPTION OF THE DRAWINGS

The foregoing and other objects and advantages of the present invention will become more apparent when considered in connection with the following detailed description and appended drawings in which like designations denote like elements in the various views, and wherein:

FIG. 7A is a photograph of containers with raw shear-stiffening gel and isopropyl alcohol as well as a container for a soak process, and FIG. 7B is a diagram of a string at different "soak and dry" steps;

FIG. 8 is a schematic representation of the shear thickening fluids (STF)/TSA system according to the present invention;

FIG. 9A shows a diagram of prepared Kevlar string and STF/Kevlar string.

FIG. 11A is STF/Kevlar string at Ø1 mm and Ø1.5 mm, FIG. 11B is Ø4 mm tube STF/Kevlar string at 1*Ø1 mm, 2*Ø1 mm and 3*Ø1 mm and FIG. 11C is Ø4 mm tube STF/Kevlar string at 1*Ø1.5 and 2*Ø1 mm;

FIG. 12A shows a Ø6 mm tube STF/Kevlar string at 1*Ø1 mm, 3*Ø1 mm, 5*Ø1 mm and 9*Ø1 mm and FIG. 12 B shows a Ø6 mm tube STF/Kevlar string at 1*Ø1.5 mm, 3*Ø1.5 mm and 5*Ø1.5 mm;

DETAILED DESCRIPTION OF THE INVENTION

Figure 1:
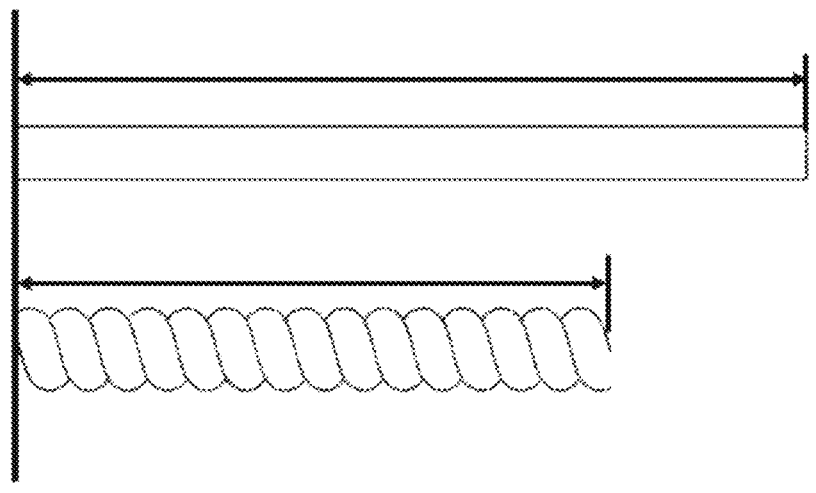
FIG. 1 is a diagram illustrating the basic concepts of a twisted string actuator (TSA) system.

A string can be characterized as being powerful, compact, simple and light-weight. It can be used as a twisted string actuator (TSA) when combined with a small-size dc motor, which features high speed and low torque. The drive mechanism of this arrangement is similar to human muscle contraction and the actuation system is very well suited for implementation in highly integrated robotic devices. The principle of twisted string actuators is that twisting a string with an electric motor produces a length contraction, thereby generating a linear displacement and pulling force at the other end. FIG. 1 shows the concept of a TSA system.

Figure 2:
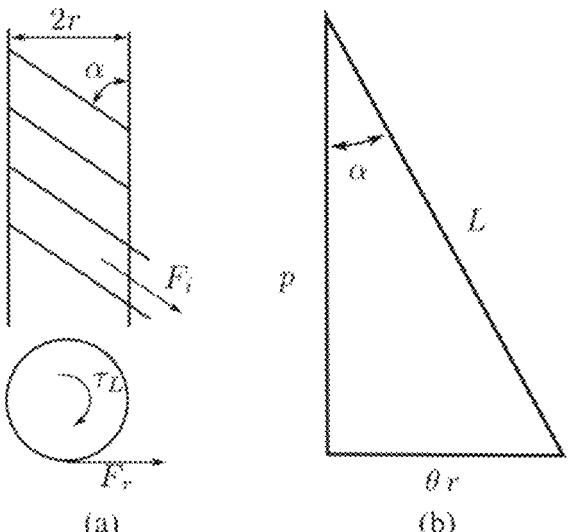
FIG. 2 is a set of diagrams illustrating the geometry of a string in a TSA system during twisting.

A geometric model of a string during twisting is shown in FIG. 2. After the string is twisted by an angle θ, the relationship between the motor angle and the contracted length in the load direction can be calculated from the geometry of the helix formed as follows:

$$L = \sqrt{\theta^2 r^2 + p^2} \tag{1}$$

$$\sin\alpha = \frac{\theta r}{L}, \cos\alpha = \frac{p}{L}, \tan\alpha = \frac{\theta r}{p} \tag{2}$$

where L is the string length, θ is the twisting angle, and also the angle of rotation of the motor, p is the contracted length in the load direction and α is the helix angle.

Figure 3:
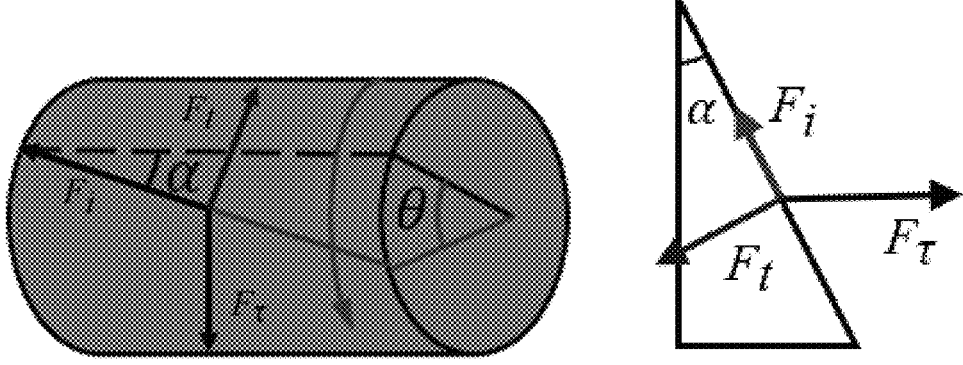
FIG. 3 is a schematic force diagram of a section of twisted string.

In order to provide comprehensive knowledge of the force condition of the TSA, a force analysis is conducted regarding a section of twisted string (FIG. 3). When motor torque is applied to the string, a tangential force $F_\tau$ is generated. Due to the contraction in the load direction, the tension $F_i$ is produced in the string. The torsional stiffness of the string itself creates a positive pressure $F_t$ that is perpendicular to the direction of the string helix between the strands. These three forces keep the twisted string in balance.

The relationship among the forces can be deduced as follows:

$$F_t = F_\tau \cdot \cos \alpha \tag{3}$$

$$F_i = F_\tau \cdot \sin \alpha \tag{4}$$

$$F_z = F_i \cdot \cos \alpha = F_\tau \cdot \sin \alpha \cos \alpha = \tfrac{1}{2} F_\tau \cdot \sin 2\alpha \tag{5}$$

Figure 4:
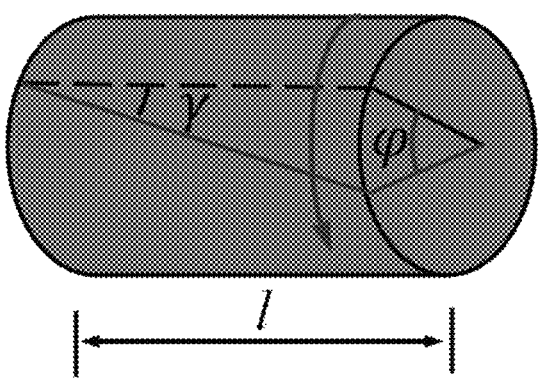
FIG. 4 is a diagram of the torsional deformation of the twisted string.

In order to analyze the influence of torsional stiffness on the axial force, the relationship between the shear modulus of the string and the axial force in the load direction is established by assuming the string is equivalent to a straight round rod and performing torsional analysis. FIG. 4 shows the torsional deformation of a section of the twisted string, γ is the shear strain, and φ is the relative torsional angle. The value for γ can be derived from the helix α, $$\gamma = \alpha = \arcsin\frac{\theta r}{L} \tag{6}$$

The torque applied on the string is $$\tau = G\gamma \tag{7}$$

where G is the shear modules of the string.

According to the relationship in equations (3), (4) and (5), the resulting reverse torsional force $F_t$, tangential force $F_\tau$, and axial force $F_z$ can be calculated by:

$$F_t = F_\tau \cdot \cos\alpha = \frac{G\gamma}{\rho} = \frac{G\arcsin\frac{\theta r}{L}}{\rho} = \frac{G\arcsin\frac{\theta r}{L}}{r} \tag{8}$$

$$F_\tau = \frac{G\arcsin\frac{\theta r}{L}}{r \cdot \cos\alpha} \tag{9}$$

$$F_z = F_i \cdot \cos\alpha = F_\tau \cdot \sin\alpha\cos\alpha = \frac{G\arcsin\frac{\theta r}{L}}{r} \cdot \sin\alpha = \frac{\theta G\arcsin\frac{\theta r}{L}}{L} \tag{10}$$

From equation (10), it can be deduced that the axial force generated by the twisted string is related to the twisted angle θ, the shear modules G, the helix angle α, and the string length L. These parameters can be optimized to obtain the largest axial force.

Figure 5:
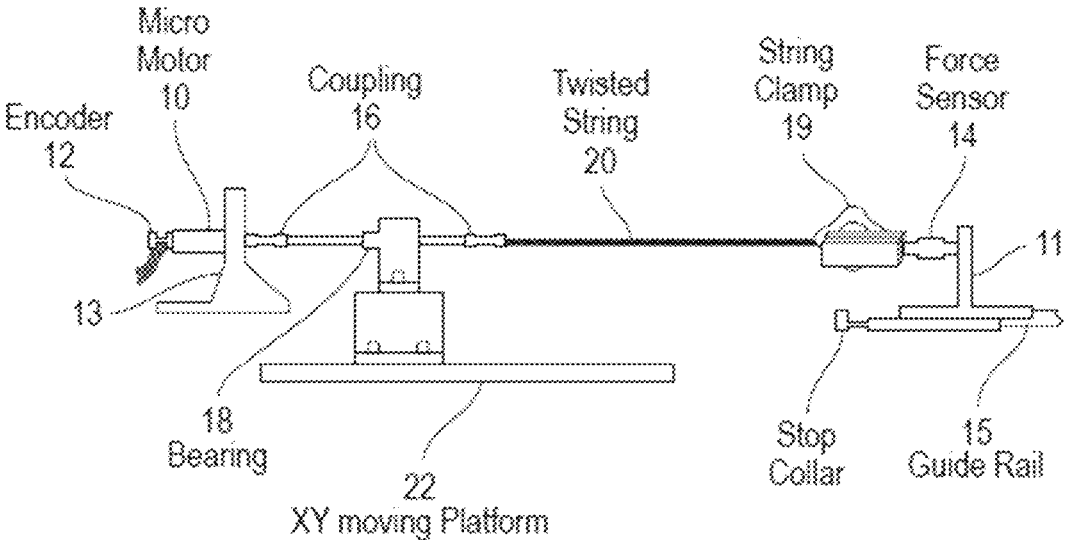
FIG. 5 is a diagram of an experimental setup of the TSA system.

An experimental platform shown in FIG. 5 was setup to evaluate the performance of the TSA transmission system according to the present invention. The testbed includes a micro rotate coreless dc motor 10 equipped with a 1024 CPT Encoder 12. A string 20 is aligned along the rotation axis of the motor and a force sensor 14 (0-500N) is fixed on a bracket 11. The motor is mounted horizontally on a frame 13 that is fixed on a guide rail 15. The string 20 is connected at one end to the output shaft of the motor by means of a coupling 16, which is supported by a vertical bearing 18. The other end of the string is connected to a special clamp 19 jointed with the force sensor 14 that is fixed to the bracket 11 on the guide rail 15. The vertical bearing 18 and the guide rail 15 are separately fixed on two XY axis moving platforms 22, which makes it convenient for adjusting the position. The bracket 11 is restricted by a stop collar 24 in the direction of the motor axis.

Figures 6A, 6B, 6C:
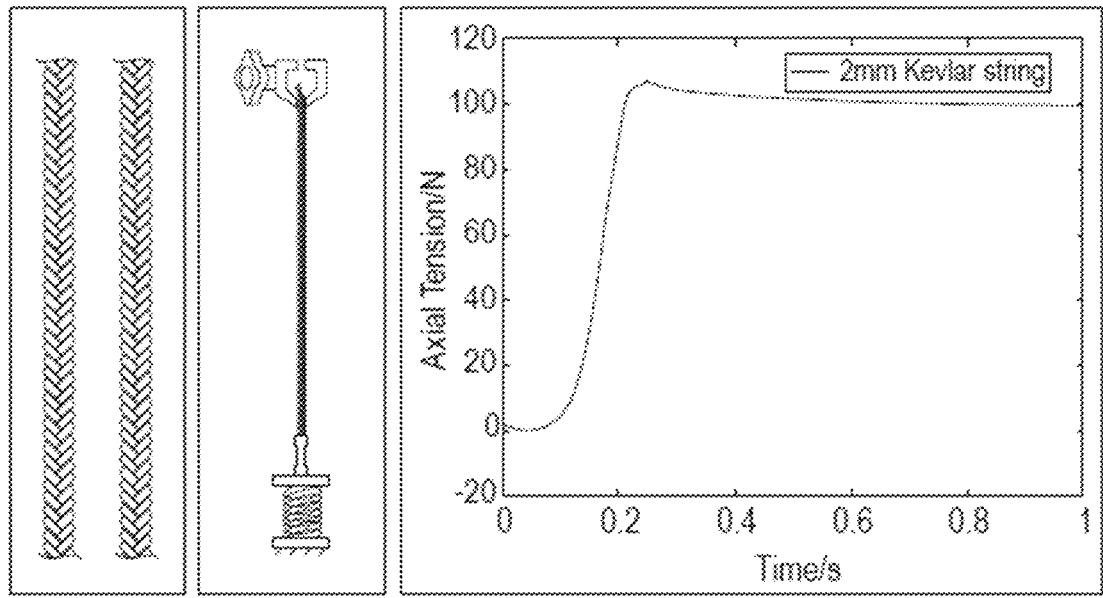
FIG. 6A is a diagram of a 2 mm Kevlar string.
FIG. 6B is a diagram of a twisted state of the string and FIG. 6C is a graph of the test results on the string.

A Ø2 mm Kevlar string with L0=0.2 m was selected to test the performance of the twisted string actuator. FIGS. 6A and B show the prepared Kevlar string and its twisted state. FIG. 6C shows the test results of the actuator. It shows that the generated pulling force can reach to more than 100N and the response time is only around 0.2 s.

Shear thickening material can sense external stimuli (mainly shear force) and then give a response automatically without the effect of external force fields such as light, electricity, heat, magnetic field, or nuclear radiation. The mechanical properties including storage modulus, elastic modulus, and yield stress, are usually markedly strengthened under the external excitation of shear, compression, and tension. Variable-stiffness artificial muscles can be made by combining shear thickening material with a twisting string actuator. A simple 'soak and dry' method can be used to impregnate the string with the shear thickening material in order to fabricate the STF-based twisted string actuator (TSA). The TSA features a high twisting speed and increasing the speed of twisting can increase the shear rates acting on the STF. When the critical shear rate is reached, the string undergoes liquid-solid transformation, thus increasing its storage modulus. Thus, the stiffness and transmission ratio of the twisted string can clearly be improved. This variable stiffness actuator design aims to augment the musculature's function by providing an auxiliary pulling force, similar to ligaments and tendons connected to human joints such as knees, ankles, arms, etc.

Kevlar fabric, which is a type of aramid-based fiber, is one of the most widely applied fabrics for making armor. Due to its light-weight, flexibility, high strength and modulus, Kevlar-based fiber composites are highly desirable in body armor. Therefore, Kevlar string and Kevlar tube were chosen to fabricate the shear thickening fluids (STF)-based twisted string actuator (TSA). The raw shear thickening fluids is polyborodimethylsiloxane (PBDMS), which is more stable and has a higher initial viscosity than the traditional shear thickening fluid that are composed of nano silica and polyethylene glycol. The (PBDMS) was obtained from Huaibang Polyurethane Technology Company. The isopropyl alcohol (IP) was obtained from Tianjin ZhiYuan Reagent Co., LTD.

A "soak and dry" process was developed to fabricate the shear thickening fluid (STF) based twisted string (see FIG. 7). First, the Kevlar string is prepared with a diameter of 2 mm and length of 300 mm. Second, 200 g of the raw shear-stiffening gel is prepared by diluting the STG at a ratio of m (STG):m (IP)=1:1 in a beaker for one hour, and stirring constantly to mix until uniform. Then, the Kevlar string is dropped into the suspension to soak for 20 min. Finally, the Kevlar string with STG is dried in an oven at 50° C. for 30 min. The "soak and dry" steps are repeated many times to make the STG combine well with the string.

FIG. 8 illustrates the working principle of STF based TSA actuation. The two ends of a Kevlar string 20 that has been impregnated with shear thickening fluids are attached to electric motor 10 and a load 30. In the initial state, the motor is not activated, and the string lies parallelly to the motor shaft direction, i.e., there is no axial tension generated to apply to the load. When the motor starts, rotation and torque are generated and they transmit the tension along the string. In this way, the string is able to rotate and generate contraction in the axial direction, producing pulling force to drive the load on the other end toward the motor. Applying different rotation speeds of motor can produce different strain rates on the shear thickening gel. Thus, the STF based TSA system can act with different stiffness at different motor speeds. The stiffness of the string has an important influence on the transmission ratio of the actuator.

When the strain rate of the STF is increased the mechanical properties, such as storage modulus, stiffness, and viscosity, increase dramatically. Thus, the STF based TSA has nearly the same compliance as the TSA without STF at a low twisted speed, while it has a great stiffness at a high rotation speed. At the same transmission angle, the STF based string can transmit a higher torque and generate a larger pulling force in the axial direction. Many types of experimental tests were conducted to evaluate the performance of the proposed STF/TSA transmission model as indicated below.

(1) Ø2 mm Kevlar String and Ø2 mm STF/Kevlar String Contrast Experiment

Figure 9B:
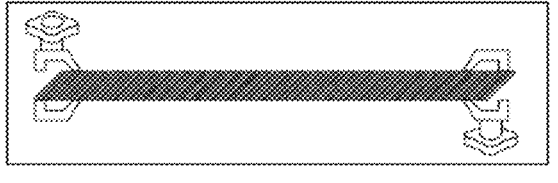
FIG. 9B shows a diagram of the twisted state of the Ø2 mm Kevlar string and FIG. 9C shows a diagram of the twisted state of the Ø2 mm STF/Kevlar string.
Figure 9C:
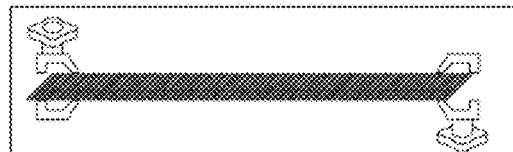

The Ø2 mm Kevlar strings with L0=0.2 m were selected to test the performance of the shear thickening material. FIG. 9A shows the prepared Kevlar string and STF impregnated Kevlar string that were tested in the experimental platform. The experiments were conducted with three Kevlar strings and three STF/Kevlar strings, respectively, 4-6 times for each string at 3600 rpm with both ends fixed. FIGS. 9B and C shows the twisted state of the strings. The maximum idling motor speed for twisting the strings was 4186 rpm, which is sufficient for reaching the critical shear rate of the shear thickening material.

Figure 10:
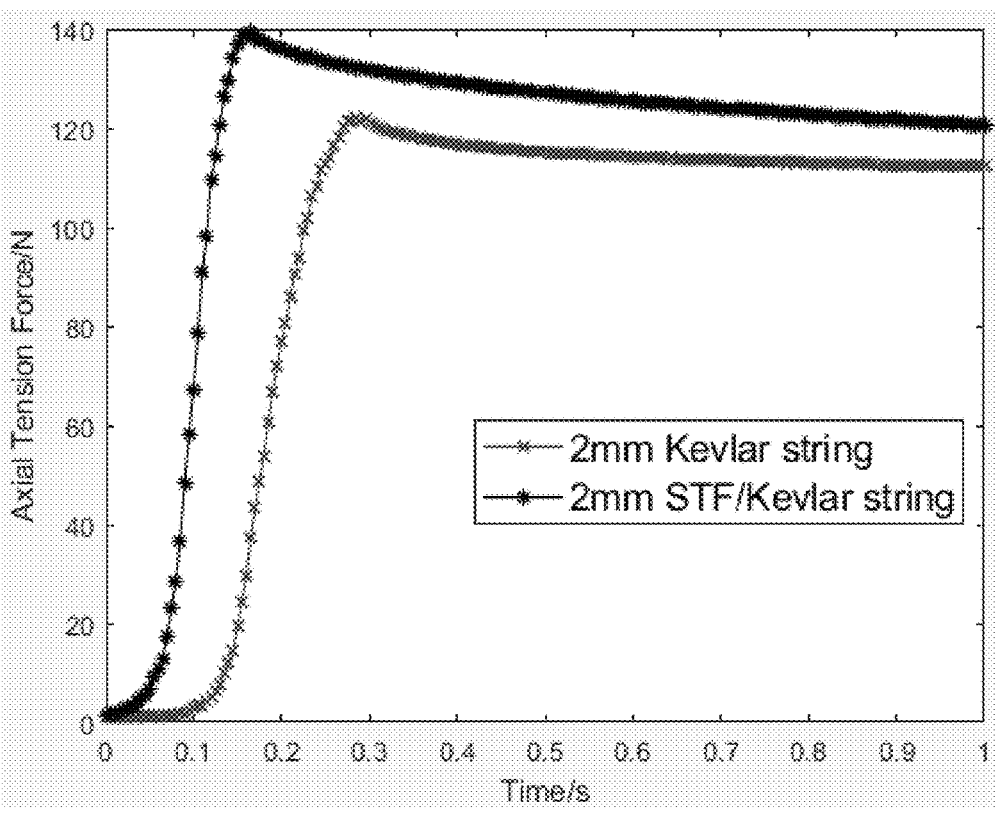
FIG. 10 is a graph comparing the axial tension force in Ø2 mm Kevlar string and Ø2 mm STF/Kevlar string.

FIG. 10 shows the results of the Ø2 mm Kevlar string and Ø2 mm STF/Kevlar string tests. It can be seen that the pulling force of STF/Kevlar string increased by nearly 20N compared to the Kevlar string at the moment when the string is twisted at its maximum rotation speed. The response time of STF/Kevlar string was also faster, around 0.1 s, than the Kevlar string. The peak force and response time of STF/Kevlar are much better than neat Kevlar, because in high rotation speeds the shear thickening material produces the effect of shear thickening. When twisting the string, the shear thickening material impregnated into the string is sheared between turns of the string. At the moment the string is twisted at its maximum rotation speed, the shear force applied on the string increased abruptly, resulting in high shear strain rates. Hence, the shear thickening effect occurred, and the stiffness of the string increased sharply, leading to a high transmission ratio that can be used to generate a high pulling force.

(2) Testing Different Combinations of Kevlar Tube and STF/Kevlar String

Because the shear thickening material in the Kevlar string is easily extruded out and may shed after twisting many times, a Kevlar tube was introduced as a wrap around the STF/Kevlar strings. The function of the Kevlar tube was to protect the shear thickening material from being shed from the string as well as to generate a larger shear force acting on STF. In order to include as much shear thickening material as possible and to improve the transmission ratio, the Ø1 mm and Ø1.5 mm Kevlar strings were employed because the smaller the diameter of the string, the greater the number of strings that can be packed into the Kevlar tube. As a result, the overall shear thickening material is higher than with a single larger diameter string. FIG. 11A shows the prepared Ø1 mm and Ø1.5 mm STF/Kevlar strings, FIGS. 11B and C shows the Ø4 mm Kevlar tube with different numbers of Ø1 mm and Ø1.5 mm STF/Kevlar strings, and FIGS. 12A and B show the Ø6 mm Kevlar tube with different numbers of Ø1 mm and Ø1.5 mm STF/Kevlar strings. Control experiments of Kevlar tubes with neat Kevlar strings were all conducted to compare the shear thickening effect. Each combination was tested 3-5 times at 3600 rpm with both ends fixed.

Figure 13A:
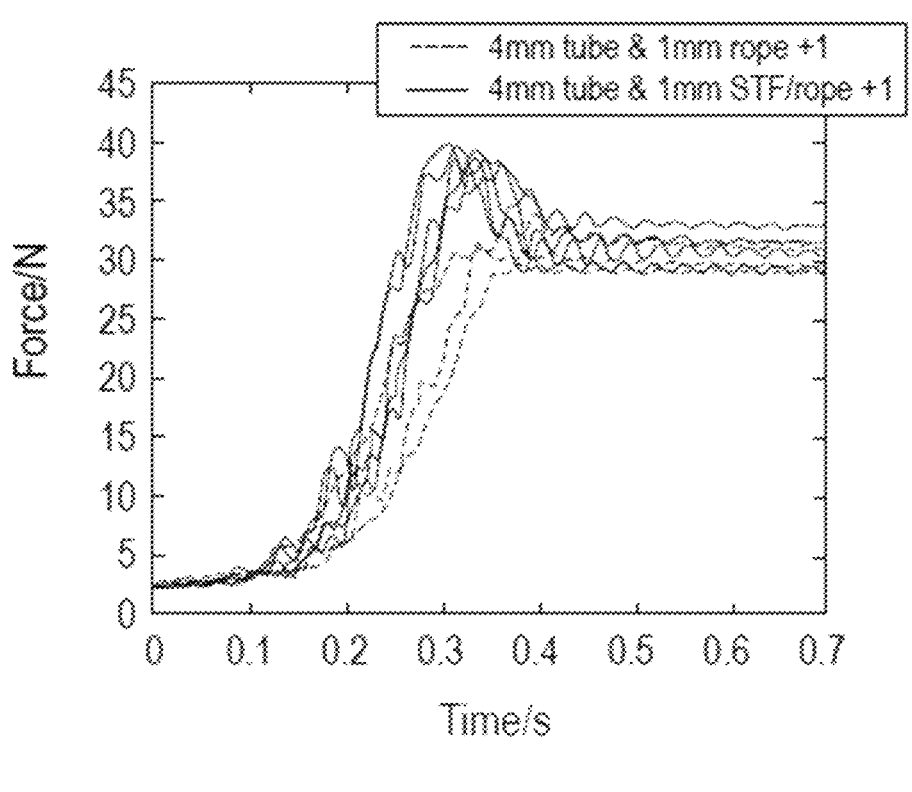
FIGS. 13A-13C shows graphs and diagrams of the test results on a Ø4 mm Kevlar tube with different numbers of Ø1 mm STF/Kevlar strings.
Figure 13A:
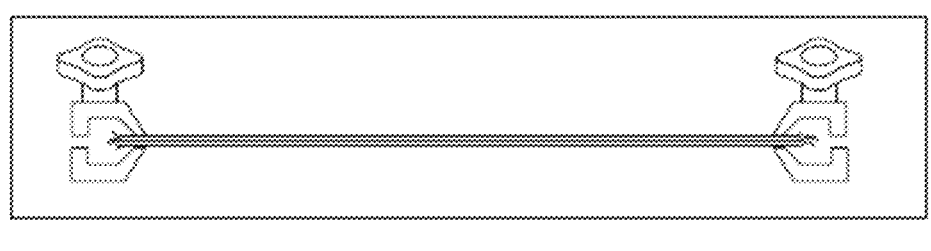
Figure 13A:
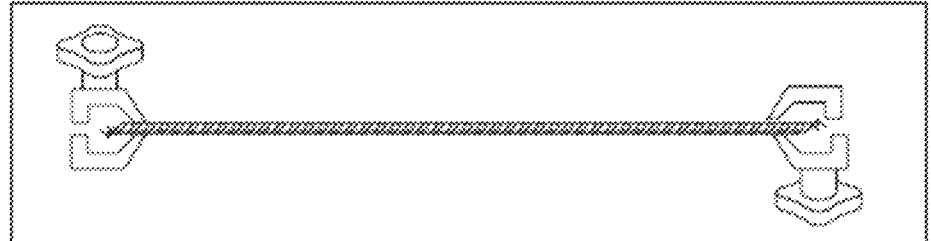
Figure 13B:
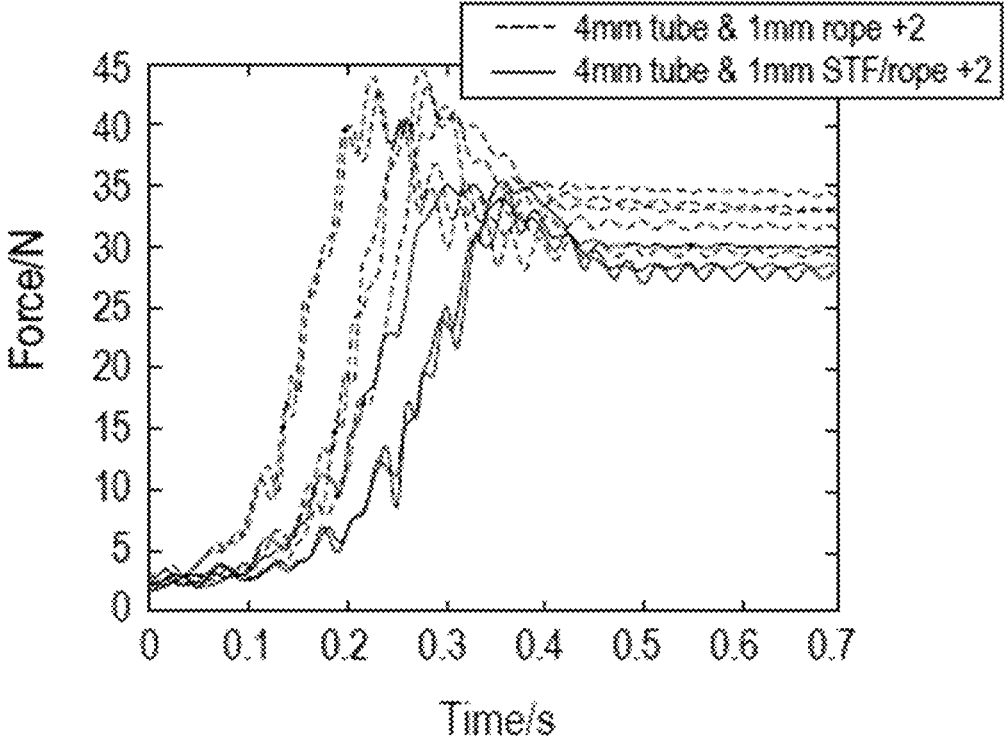
Figure 13B:
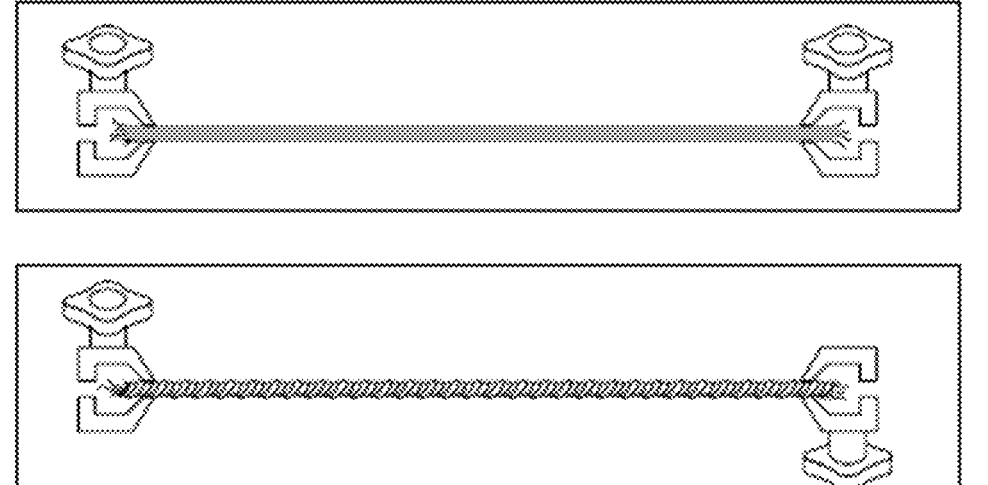
Figure 13C:
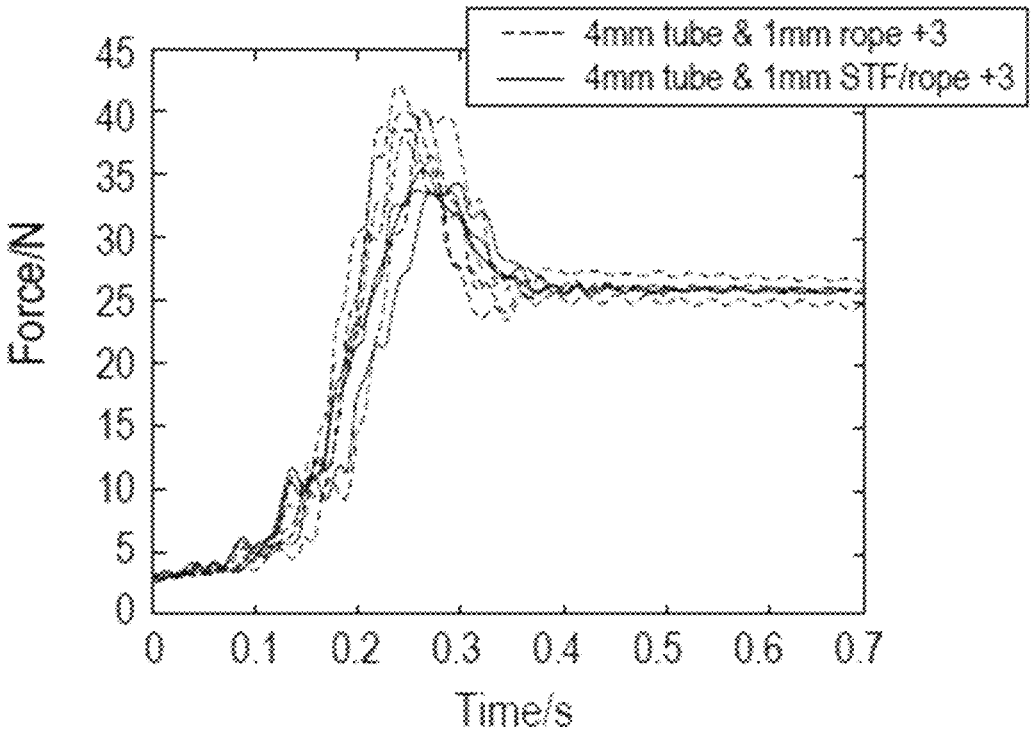
Figure 13C:
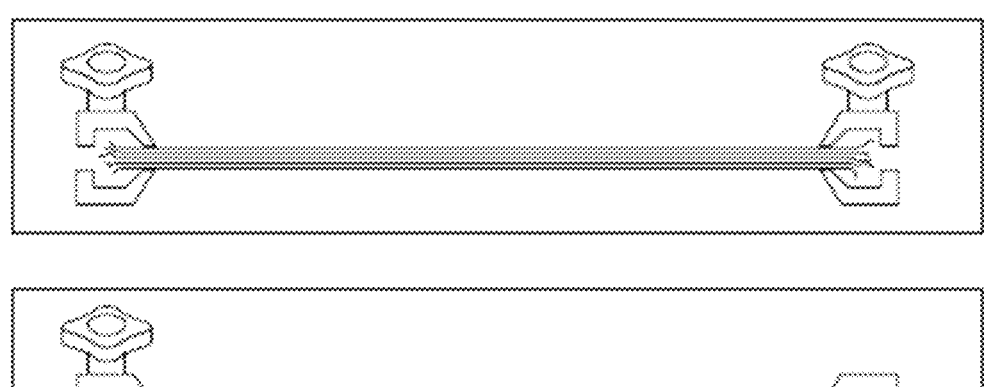

FIGS. 13A-13C shows the results of a Ø4 mm Kevlar tube combined with 1, 2, and 3 Ø1 mm STF/Kevlar strings and its corresponding twisted state. The red lines are the result of the Kevlar tube with Kevlar string, while the blue lines are the Kevlar tube with STF/Kevlar string. Each test result was plotted in the figure, and the consistency of each test was better on the whole. The increase in axial force of STF/Kevlar string is clear compared to the neat Kevlar. Moreover, the difference between two Kevlar strings and two STF/Kevlar strings was the largest, which was nearly 10N.

Figure 14:
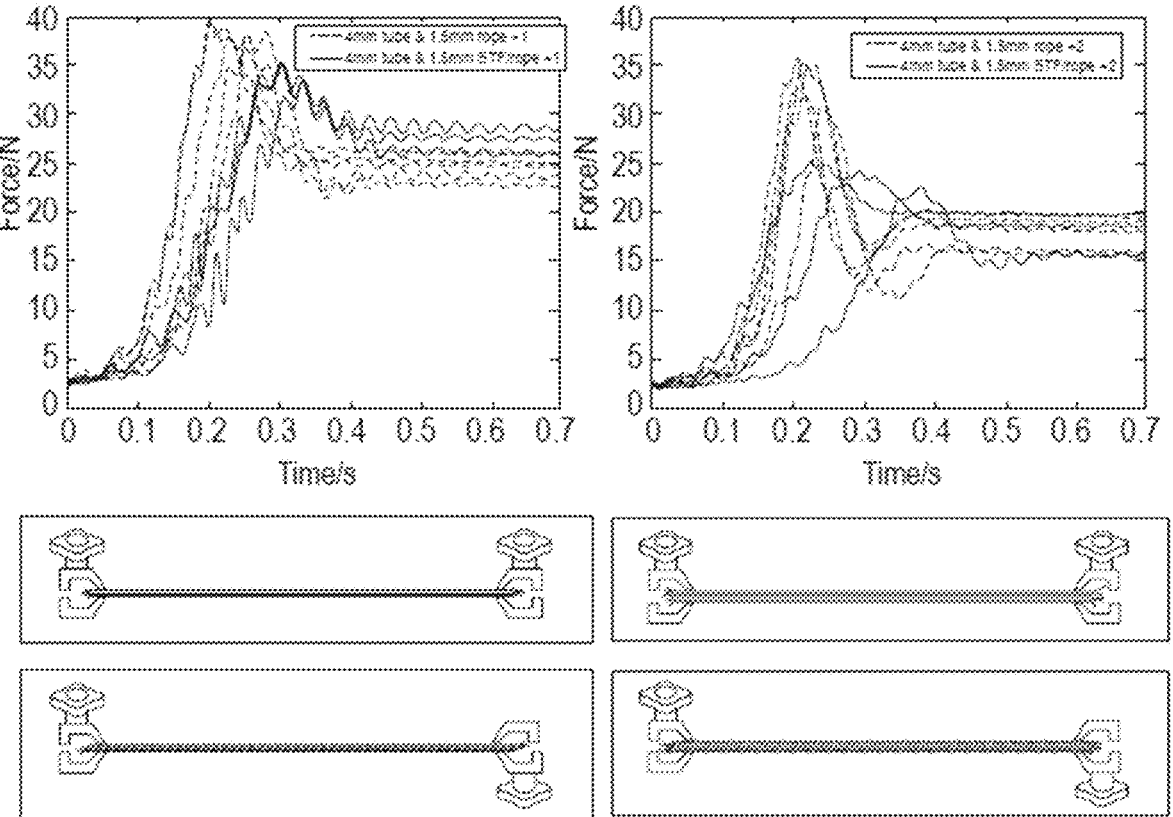
FIG. 14 shows graphs and diagrams of the test results on a Ø4 mm Kevlar tube with different numbers of Ø1.5 mm STF/Kevlar strings.

FIG. 14 shows the results of a Ø4 mm Kevlar tube combined with one and two Ø1.5 mm STF/Kevlar strings and the twisted state. The increase with two STF/Kevlar strings is more evident than with one STF/Kevlar string, which are 11N and 6N, respectively.

Figure 15A:
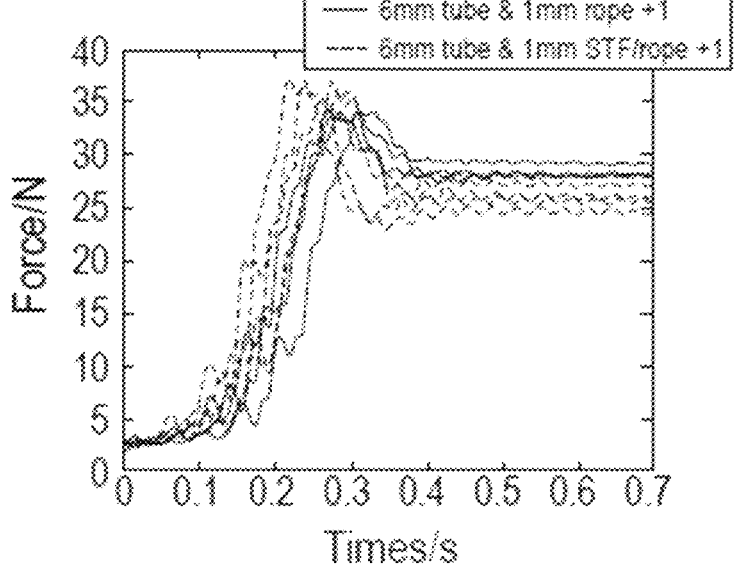
FIGS. 15A-15D shows graphs and diagrams of the test results on a Ø6 mm Kevlar tube with different numbers of Ø1 mm STF/Kevlar strings.
Figure 15A:
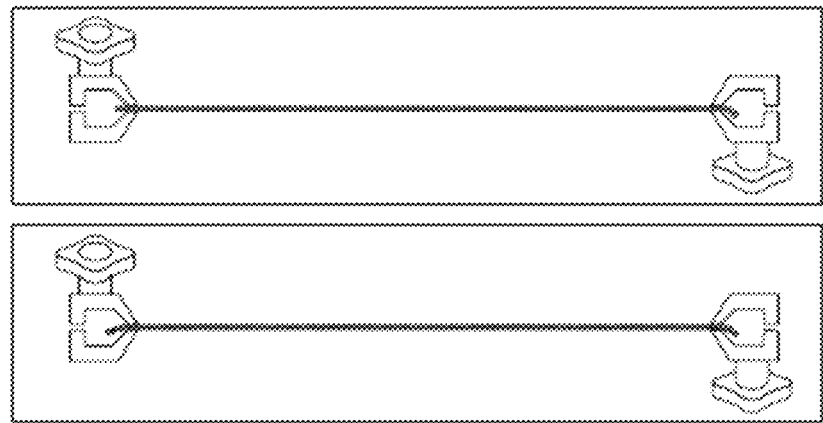
Figure 15B:
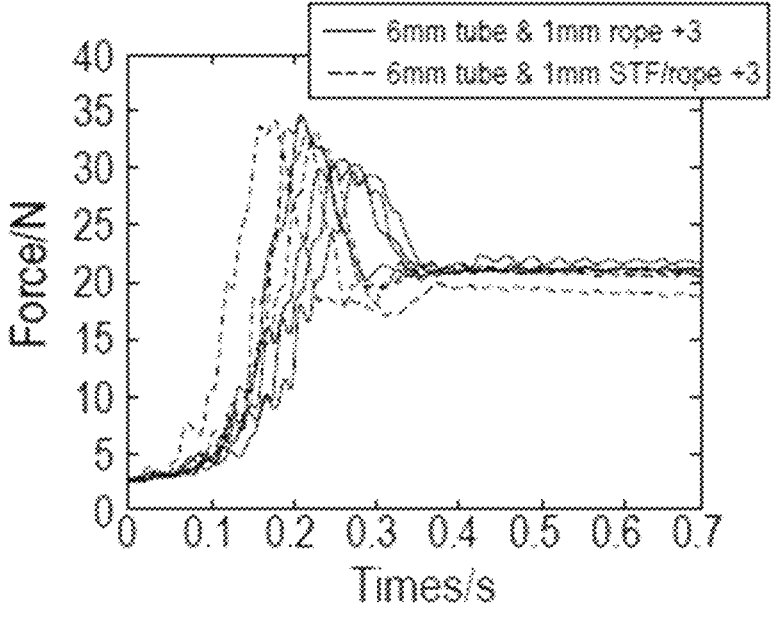
Figure 15B:
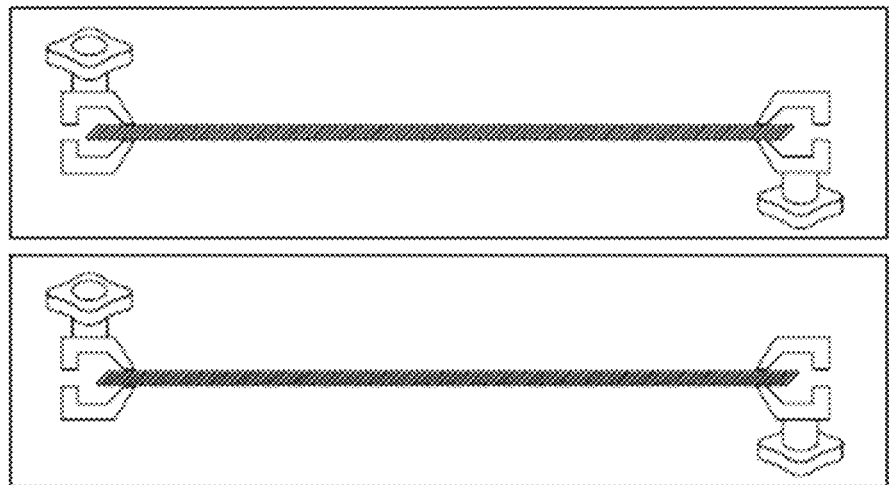
Figure 15C:
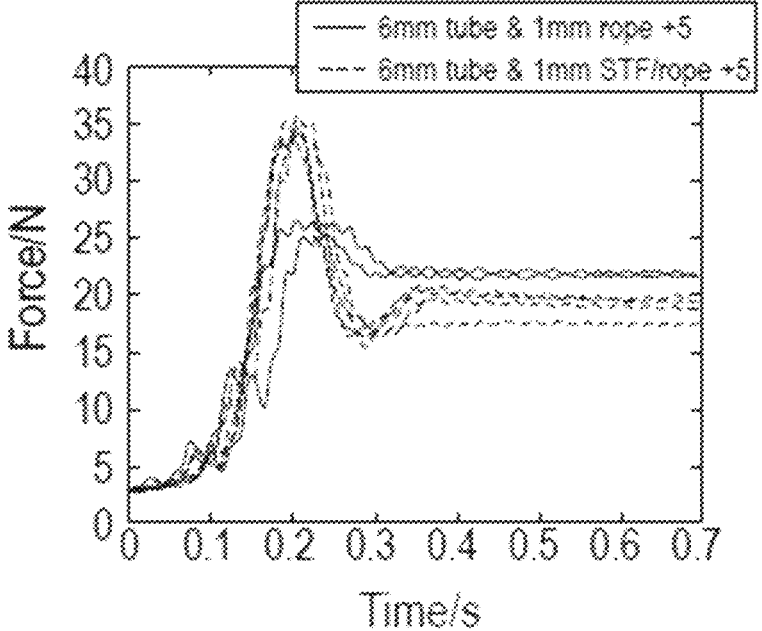
Figure 15C:
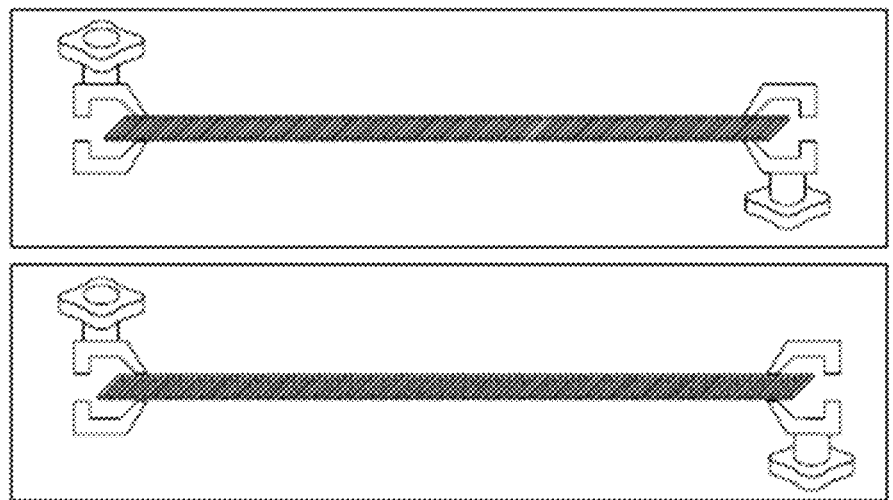
Figure 15D:
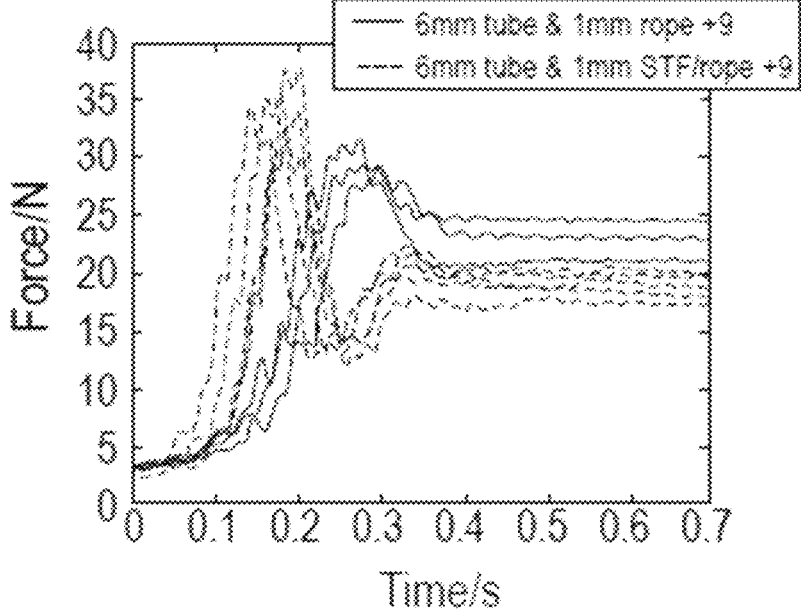
Figure 15D:
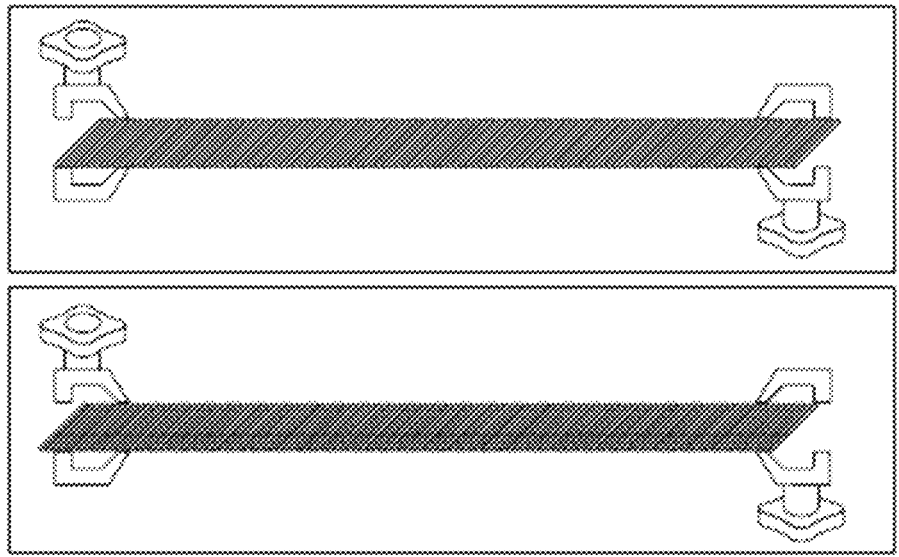

FIGS. 15A-15C shows graphs and photos of the results of test on a Ø6 mm Kevlar tube combined with 1, 3, 5, and 9 Ø1 mm STF/Kevlar strings and their corresponding twisted states. Among the four types of groups, the combination of five strings has the largest increase of axis force, and the other three groups do not show any significant change over the case with five strings. From the twisted state, it can be seen that too many strings made the Kevlar tube hard to twist. This is because the overall diameter is large, the stiffness is high, and high torque is required, whereas the torque for all combinations is the same.

Figure 16A:
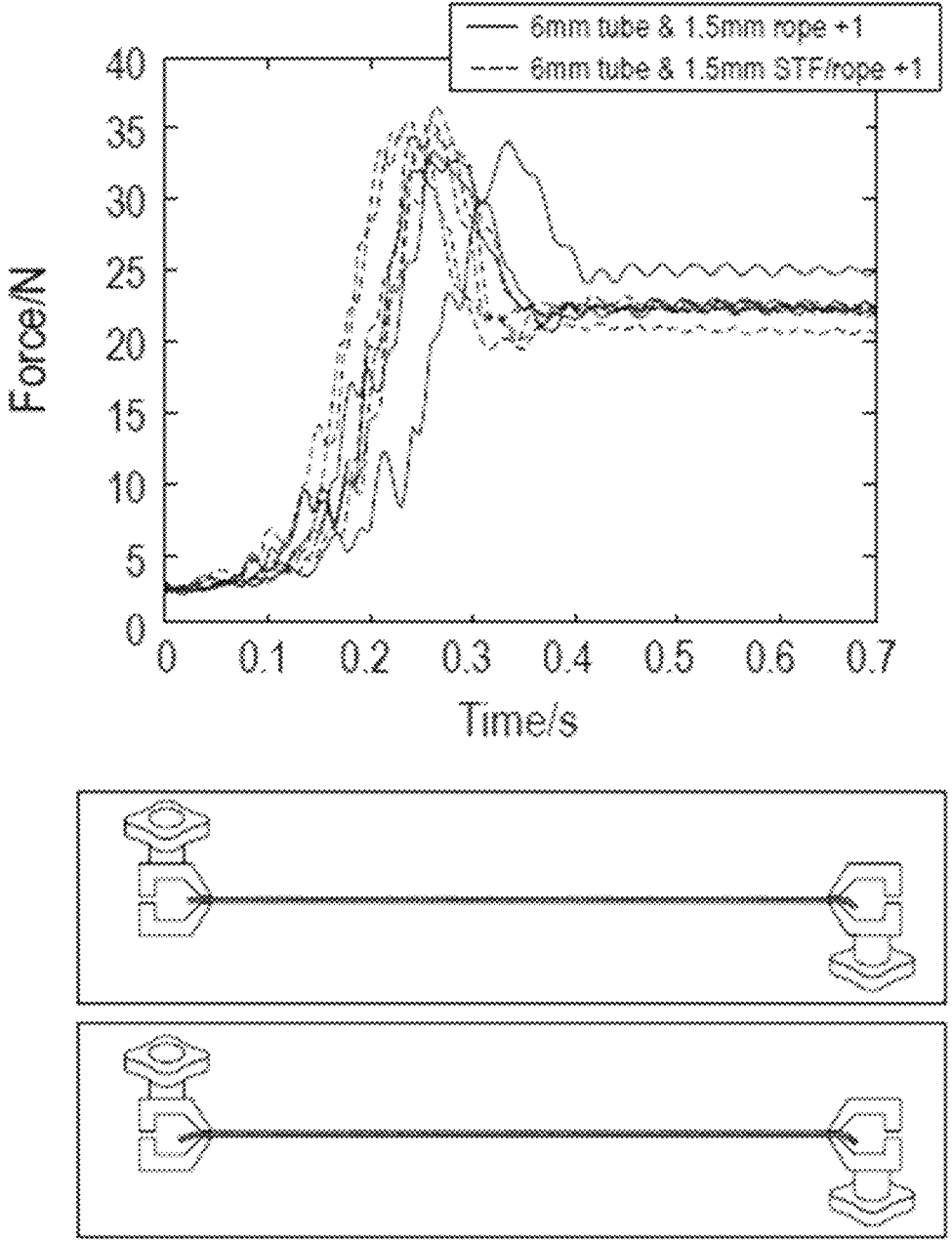
FIGS. 16A-16C shows graphs and diagrams of the test results on a Ø6 mm Kevlar tube with different numbers of Ø1.5 mm STF/Kevlar strings.
Figure 16B:
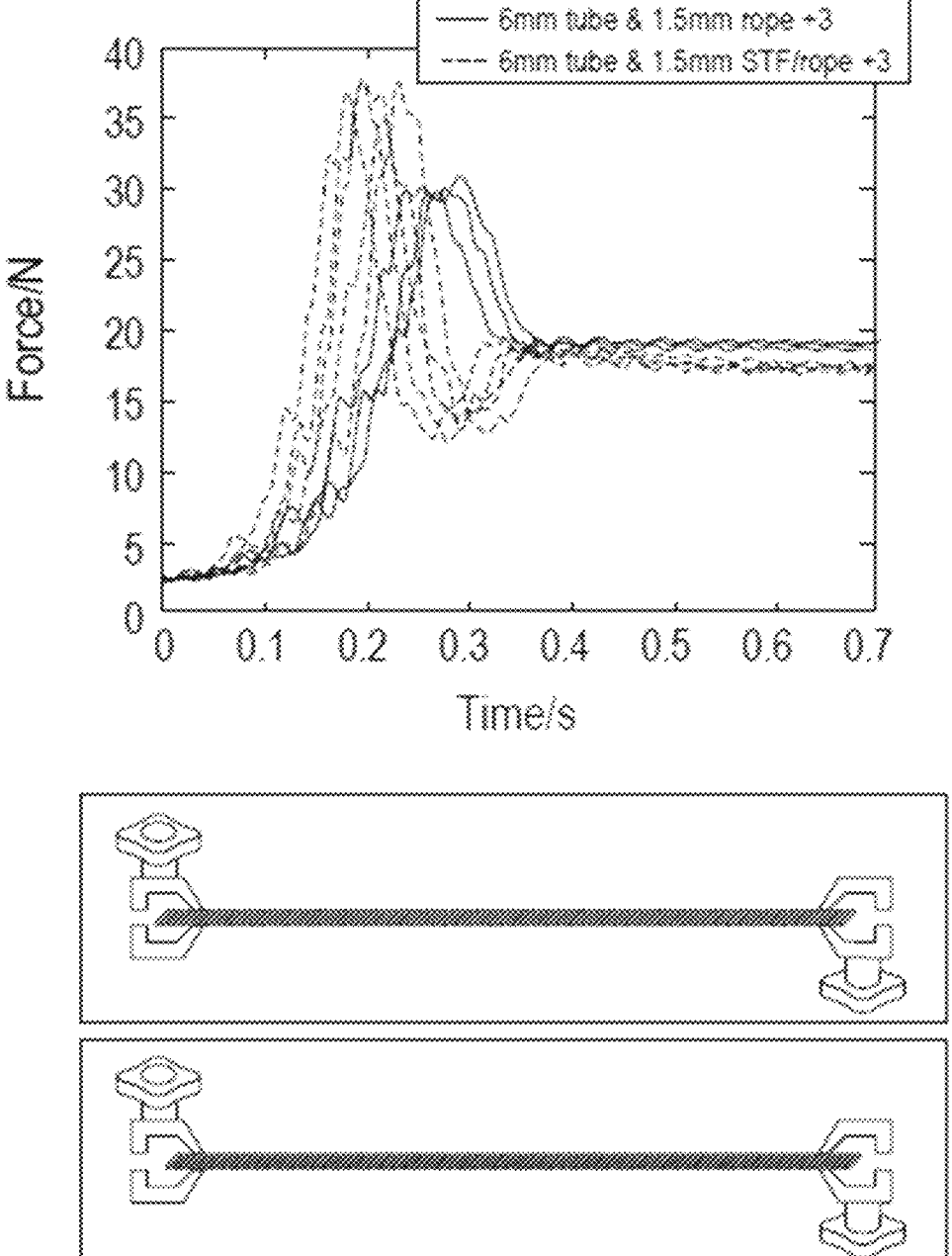
Figure 16C:
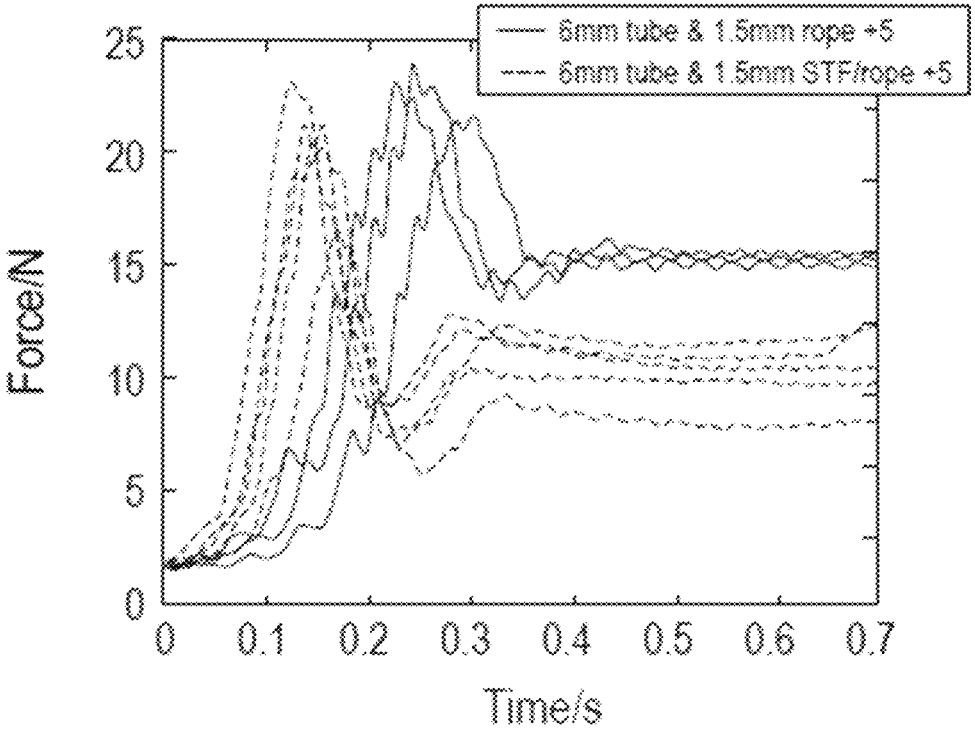
Figure 16C:
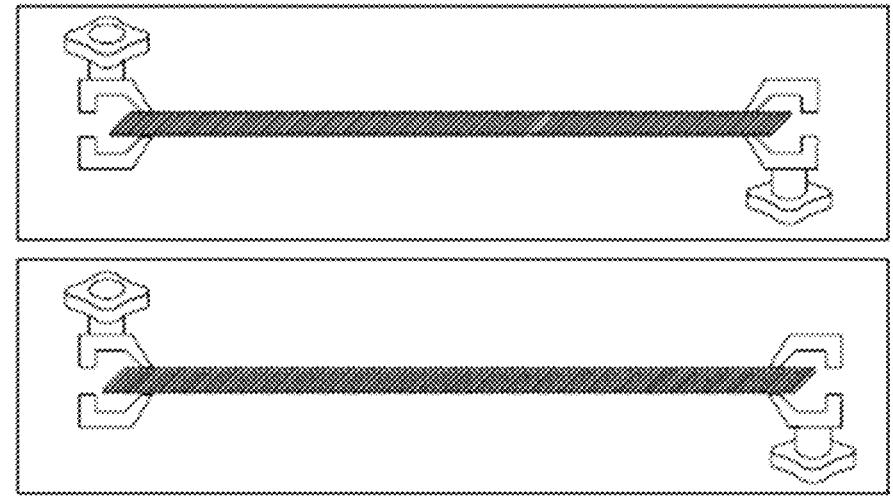

FIGS. 16A-16C shows graphs and photos of the results of tests on a Ø6 mm Kevlar tube combined with 1, 3, and 5 Ø1.5 mm STF/Kevlar strings and their corresponding twisted states. The three strings have better performance, while the one and five have little increase in pulling force when compared to the neat strings.

Based on all of the combinations of Kevlar tube and string, it can be seen that the STF/Kevlar string has better performance in pulling force and response time compared to neat Kevlar string. The clear increase in force can be sorted as follows: Ø4 (Kevlar tube)+Ø1.5 (Kevlar string)+2 (number of strings) (12N)>Ø4+Ø1+2(11N)>Ø6+Ø1+5 (10N)>Ø6+1.5+3 (8N)>Ø+1.5+1 (5N)>Ø6+1+9 (4N). It can be deduced that the number of strings packed into tubes should not be too many or too few. With too few, the increase of force is not obvious, and too many reduces the space to generate friction and lowers the transmission ratio. However, the structure of the tube is slacker than the single Ø2 mm Kevlar string, and the overall diameter of the combined tube/string is large, and therefore the pulling force and response time behaviors are not as good as the single Ø2 mm Kevlar string.

Multiple-Motor Approach for Muscle-Like Actuators: Ideas, Design, Control Methods and Testing Results Muscles have multi-layer fiber structures with successive levels of fiber-like substructures called fascicle, muscle fiber, myofibril and myofilaments, respectively. At the muscle fibers level, it appears that contraction tension is generated by individual muscle fibers and those fibers blend into tendons that attach to the skeleton. The muscle is wrapped by connective tissue called the epimysium, which allows a muscle to contract and move effectively while maintaining its structural integrity. Inside the muscle, muscle fibers are organized into bundles, called fascicles, which are surrounded by another layer of connective tissue called perimysium.

Figure 17:
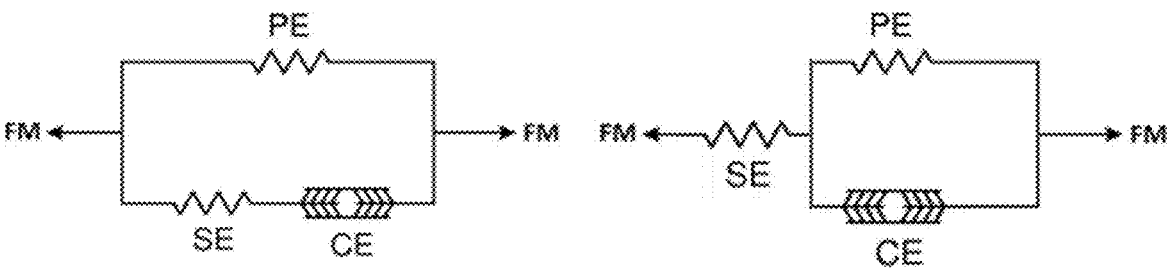
FIG. 17 is a schematic of a three-element Hill muscle model.

From the description of mechanical muscle properties, Archibald Vivian Hill proposed Hill's equations (Hill, A. V. (1938). "The heat of shortening and the dynamic constants of muscle," *Proceedings of the Royal Society of London. Series B-Biological Sciences*, 126(843), 136-195.) or the so-called "three-element Hill muscle model." In this three-element model, the muscle is described as consisting of a contractile element (CE), series elastic element (SE) and parallel elastic element (PE), which represents the mechanical muscle response of the above physiological structure, as shown in FIG. 17.

In the muscle-like actuator design of the present invention, motor-twisted strings are used to produce contraction force. Like contractile element (CE) in muscle, the rotational torque of the motor shaft will be converted into axial tension by the string. However, in muscle, the muscle force is produced by many muscle fibers. Therefore, the multiple-motor approach is used to produce the total force.

The muscle-like actuator is a flexible device that can generate force in a certain direction. From the description of muscle and the multiple-motor approach, a muscle-like actuator includes at least two or more twisted strands (e.g., wires, cables, ropes, fibers) both twisted along a certain direction. The arrangement of those strands can be parallel or staggered at a specific angle. One of the ends of those twisted fibers is attached to a first actuated element. The first actuated element can rotate and work as the rotational actuator, e. g. an electric motor. The twisted string will rotate with the motor when a rotation or torque is applied to its end. The string twists and contracts along its length to generate displacement and force at its end.

At the end of these multiple strings, motors are attached to each string by the shaft and the coupling. Each motor-string combination can rotate together as one individual unit. The individual unit is controlled to generate displacement and force, respectively. Therefore, the muscle-like actuator can convert at least two diverse rotational motion sources to corresponding linear motion. The whole system may contain two or more of these individual units. The total force of the muscle-like actuator is the summation of those individual motor-string units.

Figure 18:
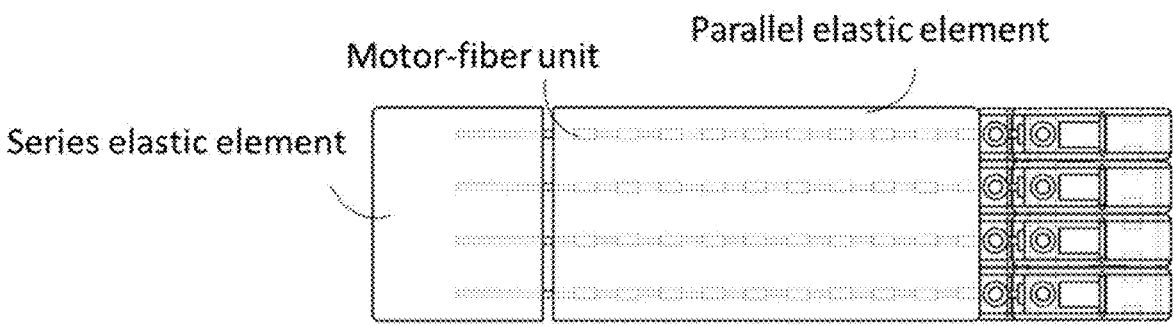
FIG. 18 is a diagram of a muscle-like actuator design model.

The series elastic element (SE) property of muscle is introduced into the muscle-like actuator. As the connection of the fixed point of muscle actuator and the end of twisted string, elastic material is used as the series elastic element (e.g. spring, fabric, rubber, silicone, urethane). The parallel elastic element (PE) property of muscle is introduced into the muscle-like actuator. As the physical isolation and constraint of individual motor-string units, the parallel elastic element can be modeled using the same or different elastic material (e.g. spring, fabric, rubber, silicone, urethane). The design of the muscle-like actuator is shown in FIG. 18.

Figure 19:
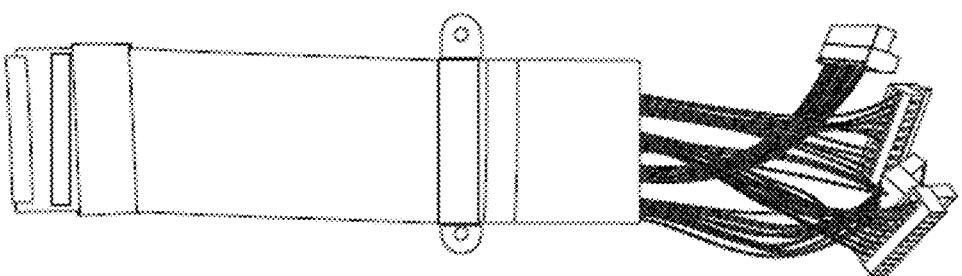
FIG. 19 is a diagrams of an example of a muscle-like actuator with a silicone rubber series elastic element and a parallel elastic element.

In some embodiments, silicone rubber is used as the series elastic element and the parallel elastic element for the muscle-like actuator. The twisted motor-string unit is embedded into a parallel elastic element. Therefore, those twisted strings work as individual force transmission units inside the parallel elastic element. The parallel elastic element elongates or contracts with the motor string unit. The effective length of the muscle-like actuator is equal to the length of the silicone rubber. The end of each fiber is attached to a series elastic element. The force transmission is along the silicone rubber series elastic element to the end of the muscle-like actuator, as shown in FIG. 19.

Figure 20:
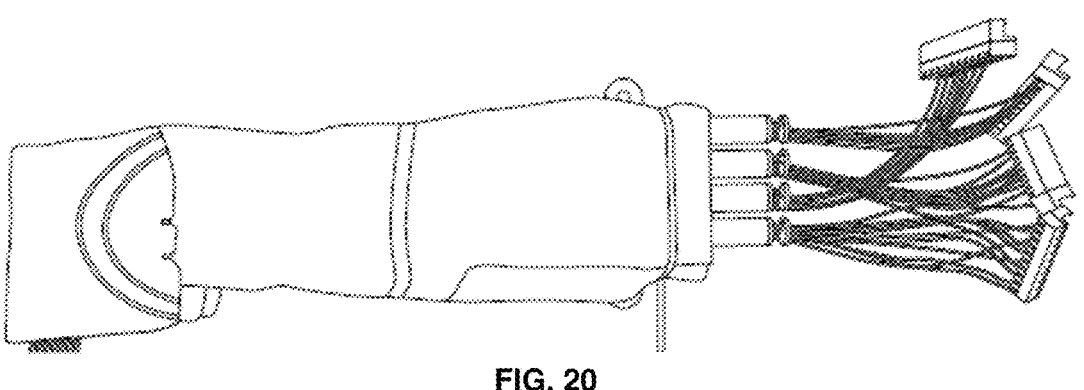
FIG. 20 is a diagrams of an example of a muscle-like actuator with a fabric series elastic element and a parallel elastic element.

In some embodiments, fabric is applied as the series elastic element and parallel elastic element for the muscle-like actuator. The twisted motor-string unit is sewn into fabric. The length of muscle-like actuator thus depends upon both the fabric parallel elastic element and the twisted motor-string unit. The whole length of muscle-like actuator contracts as the strings twist and elongate as the strings untwist. The fabric series elastic element has attachment points on both the muscle-like actuators and the twisted-string. At these attachment points, the fabric transmits contrail force from the twisted strings to the end of the muscle-like actuators, as shown in FIG. 20.

Figure 21:
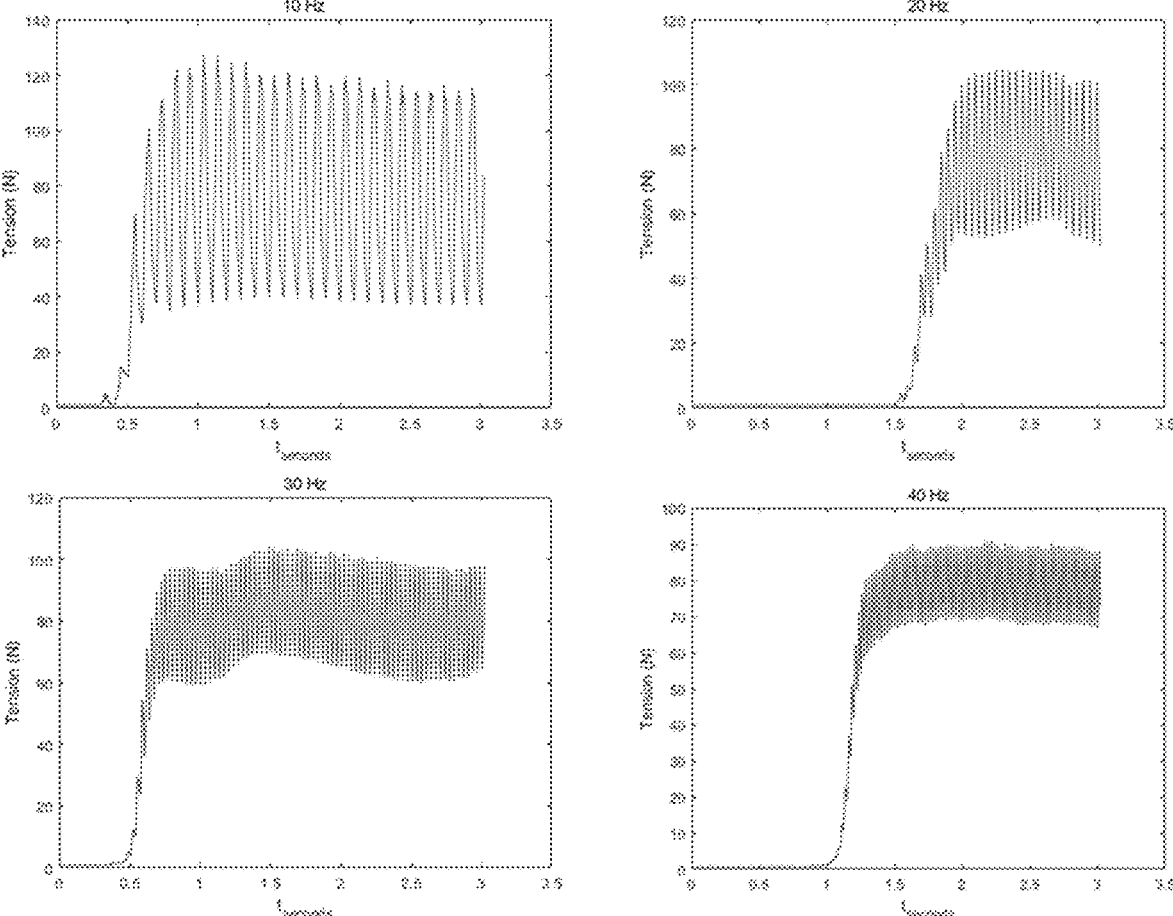
FIG. 21 is a set of graphs showing the testing results of the output force of muscle-like actuator changes with adjustment of the switching frequency of the motor.

The control of the motor can include the on-off state, position close-loop control, rotation speed closed-loop control, motor current closed-loop control and a combination of them. As the rotation of the motor is transmitted to ends of the actuator by the twisted string, producing displacement, the displacement of the actuator changes with motor rotation angle. Therefore, linear distance under external load can be measured by the motor sensor (e.g., an encoder). The output of the muscle-like actuator (e.g. displacement, contraction velocity, force) can be controlled by the input of the motor. For example, the output force of the muscle-like actuator changes with adjustment of the switching frequency of the motor. The testing results of tension-time of the muscle-like actuator are shown in FIG. 21. The output force range is more concentrated and stable as the switching frequency of the motor increases. The oscillating output of the muscle-like actuator can be used in many occasions (e.g. Fatigue tensile test).

Figure 22:
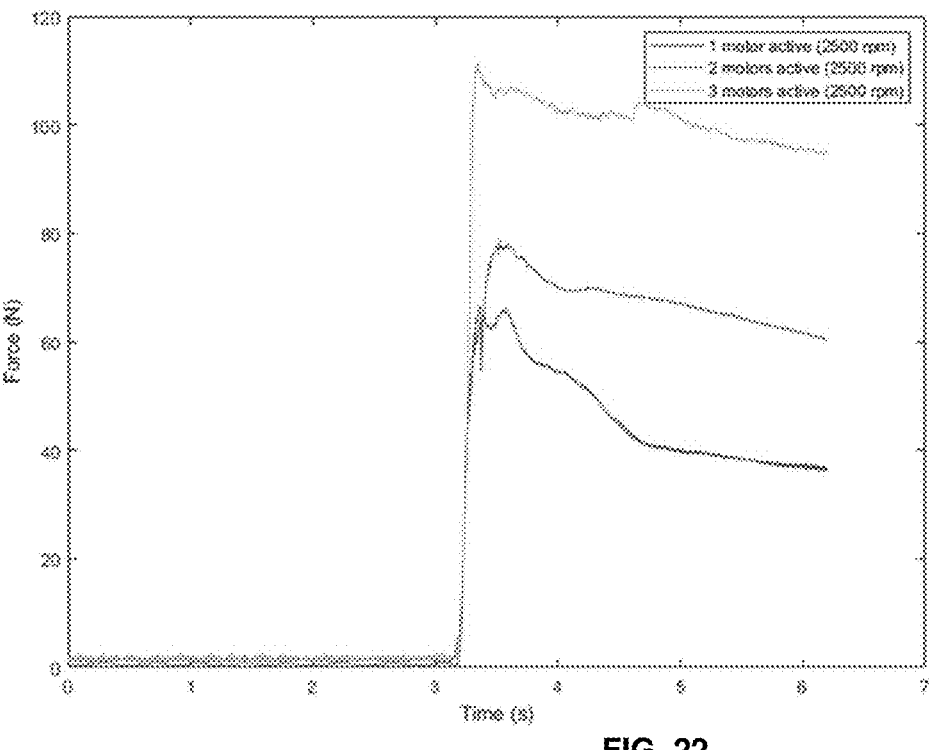
FIG. 22 is a graph of the testing results of the multiple-motor recruitment approach for an example with three motor-fiber units.

In some embodiments, a multiple-motor recruitment approach is applied. The overall output of the muscle-like actuator is usually limited by a single motor-fiber. When the output force of the single motor-fiber reaches its maximum, which means there is no space for the fiber to wind up, the actuator sensor can detect the force. In the example shown, three motor-fiber units are recruited in the test illustrated in FIG. 22.

Figure 23:
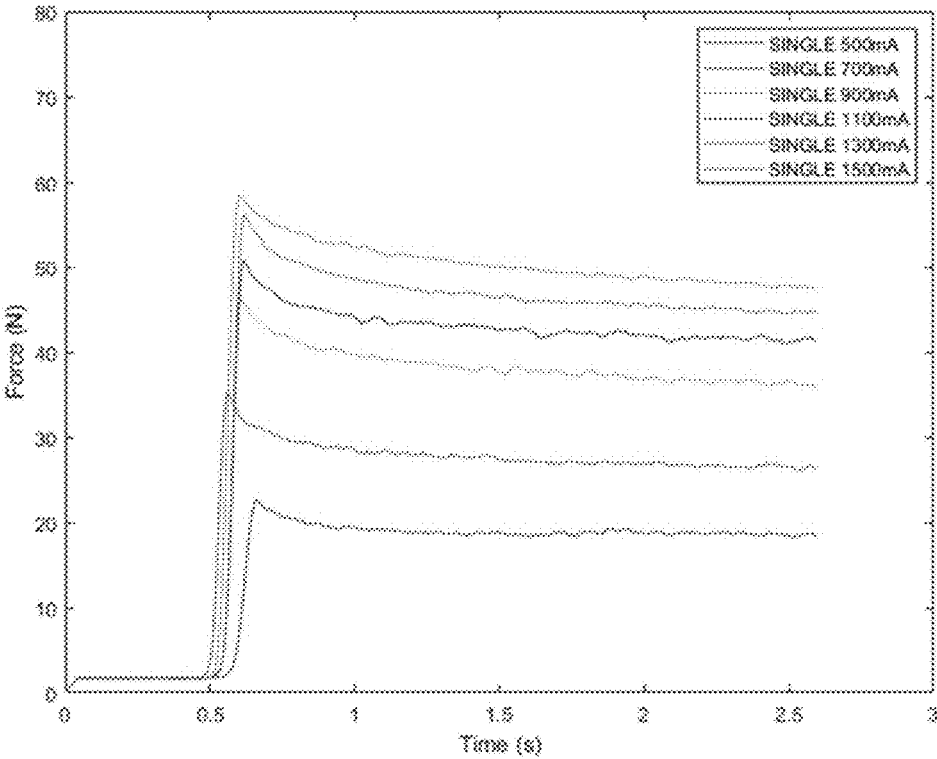
FIG. 23 is a graph of the testing results of an example using a motor control method to adjust the force output of a muscle-like actuator.

In some embodiments, fine adjustment of the force output of the signal actuation unit is required (e.g. refined grip). The force output of the muscle-like actuator is controlled by the motor control method. FIG. 23 shows an example of the motor control method used to adjust the force output of the muscle-like actuator.

Figures 24, 25:
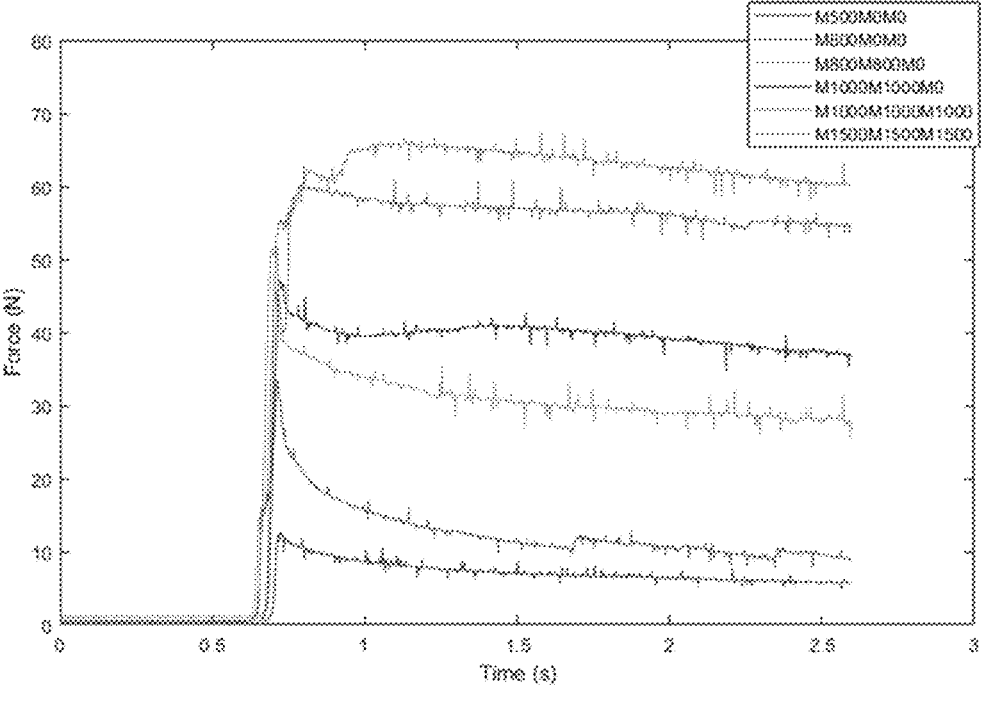
FIG. 24 is a graph of the testing results of an example of multiple motor control methods to generate around a (5N to 70N) force output range.
FIG. 25 is a graph of the testing results of an example of controlling the loading speed of a muscle-like actuator.

In some embodiments, a large range of adjustments should be applied to cover a wide range of force output of the muscle-like actuator. FIG. 24 shows an example of the combination of multiple motor control methods used to generate a force output range from around 5N to 70N.

In some embodiments, the force output of the actuator needs to be produced slowly, which means it needs to control the contraction speed of the muscle-like actuator. FIG. 25 shows an example of testing results from controlling the applied force/action speed. The force time data (more than 10 seconds) of FIG. 25 can be compared to FIG. 23 and FIG. 24, which apply the action force in around 0.3 s.

Figure 26:
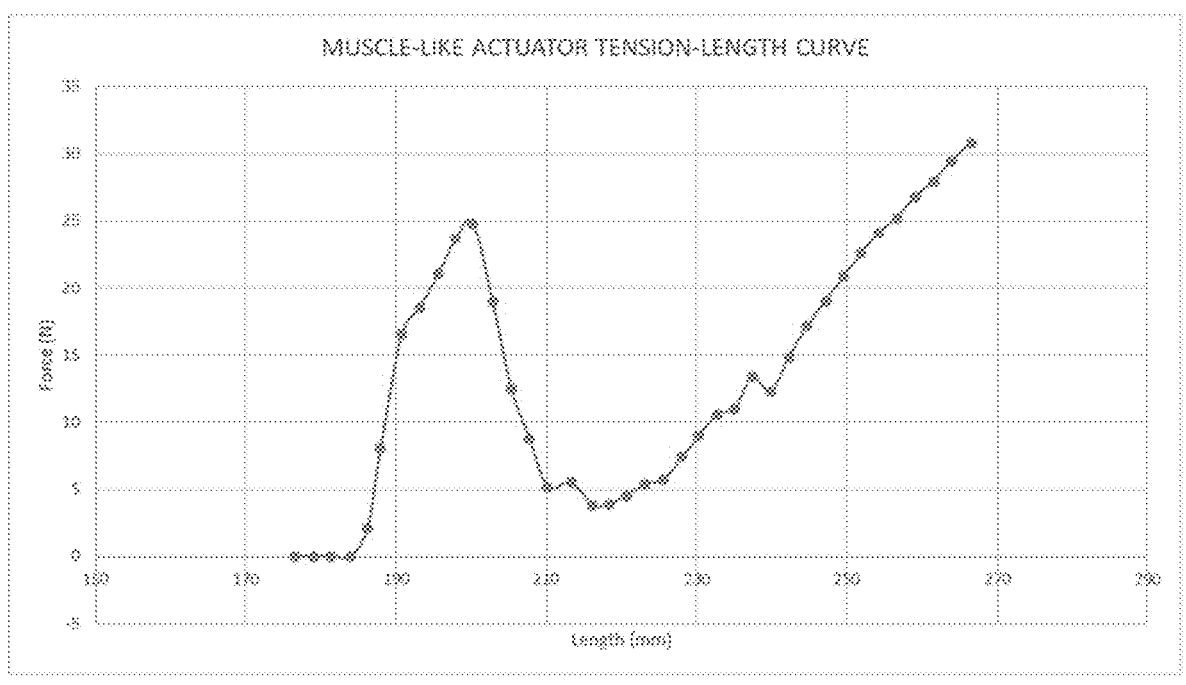
FIG. 26 is a graph of the testing results of an example of mimicking a muscle force-length curve with a muscle-like actuator.

In some embodiments, in addition to the dynamic nature of force-time, there is a need to achieve different tension of the muscle-like actuator along the length of the action range—the controllable force-length curve of the actuator. FIG. 26 shows an example of mimicking different tension along the length of the action range of the muscle, i.e., a force-length curve, with a muscle-like actuator.

Figure 27:
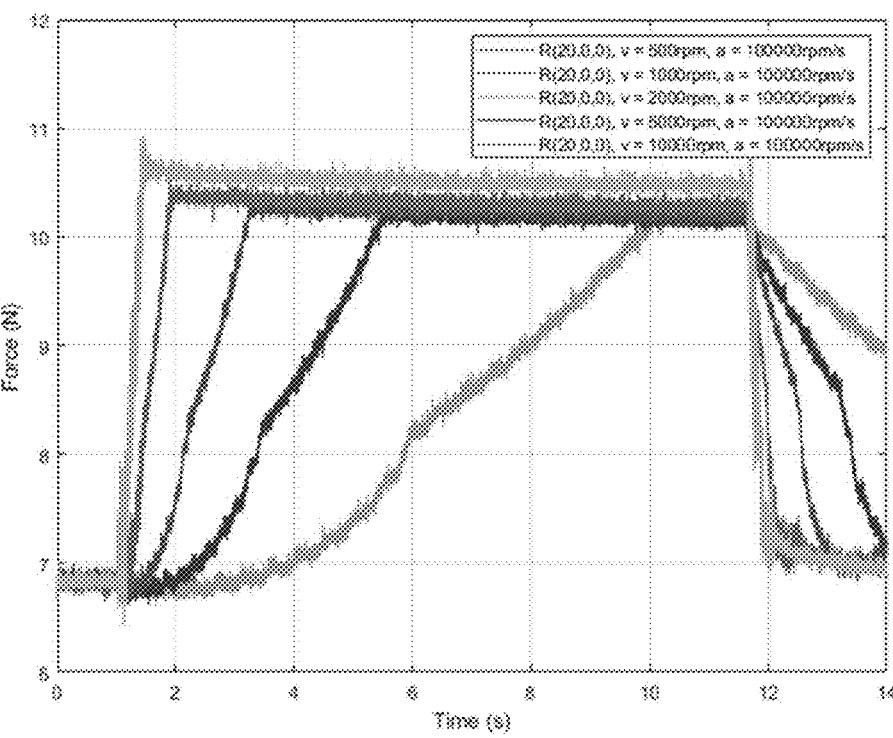
FIG. 27 is a graph of the testing results of examples of controlling the application and release of force under different motor inputs.

In some embodiments, the dynamic process of the applied force needs to be adjusted, including applying and releasing force, which is the contraction and elongation process of the muscle-like actuator. High-order characteristics of the motor need to be controlled to accomplish this. FIG. 27 shows an example of generating force under different motor rotations speeds.

Figure 28:
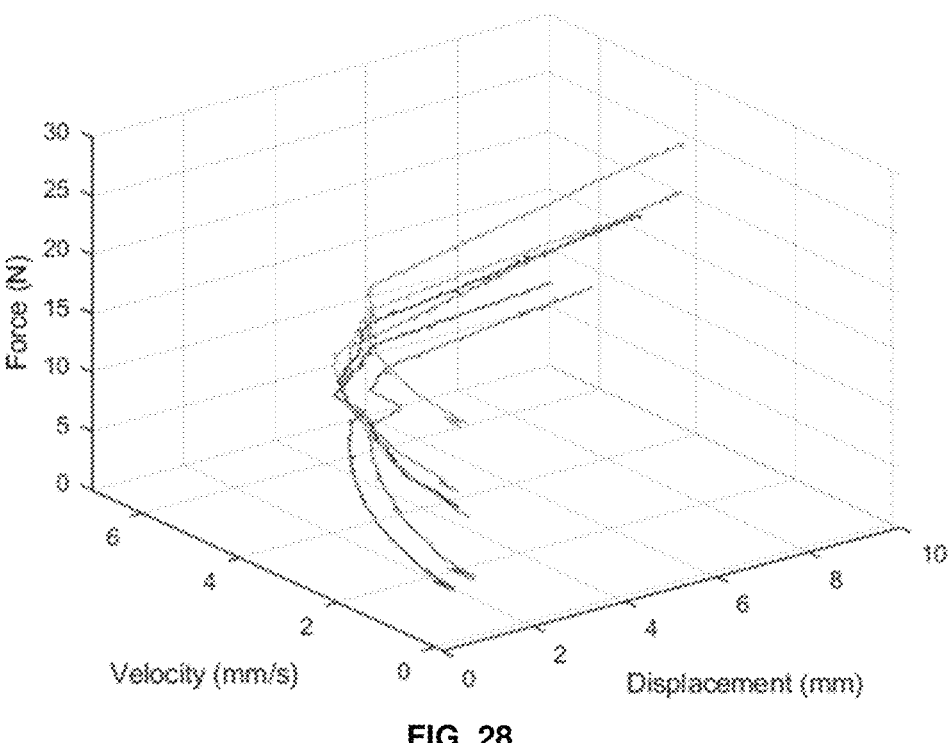
FIG. 28 is a three-dimensional graph of the testing results of an example of the track of a muscle-like actuator in force-length-velocity space.

In some embodiments, a multiple dimensions of force-length-velocity should be taken into consideration due to task requirements. FIG. 28 shows an example of the track of the muscle-like actuator in force-length-velocity space.

Figure 29:
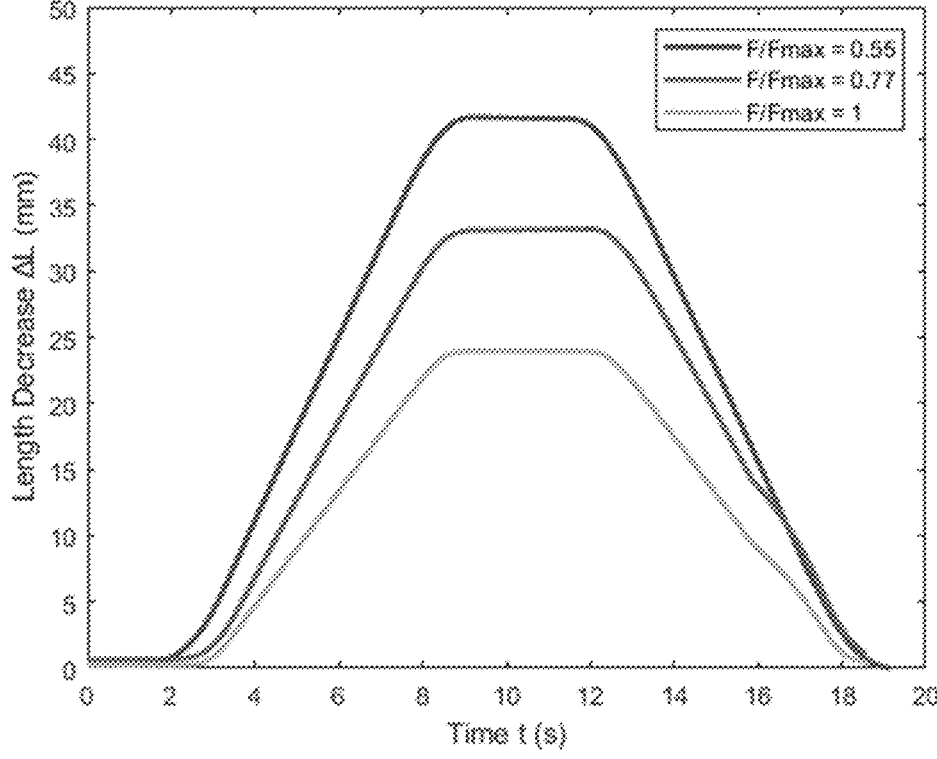
FIG. 29 is a graph of the testing results of an example of the passive stretchable properties of an actuator according to the present invention.

In addition to active force-length-velocity action of the muscle-like actuator, the passive properties of the actuator act similar to muscle. FIG. 29 shows an example of the passive stretchable property of the actuator, in which displacement decreases with the increase of the external force under the same motor input.

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. An actuator comprising:
a motor with a rotatable drive shaft; and
a string with a shear thickening fluid (STF) embedded therein, wherein one end of the string is attached to the drive shaft of the motor and another end is connected to a load to form a twisted string actuator (TSA).

2. The actuator of claim 1 wherein the string is made of a heat-resistant para-aramid synthetic fiber with a molecular structure of a plurality of inter-chain bonds.

3. The actuator of claim 1 wherein the shear thickening fluid is polyborodimethylsiloxane (PBDMS).

4. The actuator of claim 1 where in there are at least two strings and the strings are provided in a tube, wherein the strings can be parallel or staggered at a specific angle.

5. The actuator of claim 4 wherein each string is connected to a separate motor so as to convert rotational motion source to corresponding linear motion.

6. The actuator of claim 1 further including a series elastic element located between the load and the end of the twisted string actuator and a parallel elastic element located in parallel with the twisted string actuator.

7. The actuator of claim 6 wherein either or both elastic elements are made of silicone rubber.

8. The actuator of claim 6 wherein either or both elastic elements are made of fabric thereby forming a twisted motor-fiber unit, and the twisted motor-fiber unit is sewn into fabric.

9. The actuator of claim 1 further including a controller for the motor that operates according to a motor control method.

10. The actuator of claim 9 wherein the controller causes a force output of the motor to be applied slowly.

11. The actuator of claim 9 wherein the controller causes different tension of the actuator along a length of an action range.

* * * * *